United States Patent
Kotler et al.

(10) Patent No.: US 11,449,619 B2
(45) Date of Patent: Sep. 20, 2022

(54) SYSTEM AND METHOD FOR CREATING AND EXECUTING BREACH SCENARIOS UTILIZING VIRTUALIZED ELEMENTS

(71) Applicant: SAFEBREACH LTD., Tel Aviv (IL)

(72) Inventors: Itzhak Kotler, Kfar-Saba (IL); Idan Livni, Gevatayim (IL); Dan Bar-Shalom, Petah Tikva (IL); Guy Bejerano, Reut (IL)

(73) Assignee: SAFEBREACH LTD., Tel Aviv (IL)

( * ) Notice: Subject to any disclaimer, the term of this patent is extended or adjusted under 35 U.S.C. 154(b) by 142 days.

(21) Appl. No.: 17/101,086

(22) Filed: Nov. 23, 2020

(65) Prior Publication Data

US 2021/0173939 A1    Jun. 10, 2021

Related U.S. Application Data

(63) Continuation of application No. 15/856,666, filed on Dec. 28, 2017, now Pat. No. 11,017,093, which is a
(Continued)

(51) Int. Cl.
*G06F 11/00* (2006.01)
*G06F 12/14* (2006.01)
(Continued)

(52) U.S. Cl.
CPC ...... *G06F 21/577* (2013.01); *G06F 2221/034* (2013.01); *G06F 2221/2101* (2013.01)

(58) Field of Classification Search
CPC ............. G06F 21/577; G06F 2221/034; G06F 2221/2101; H04L 29/06904; H04L 29/06911; H04L 29/06918
See application file for complete search history.

(56) References Cited

U.S. PATENT DOCUMENTS

| 8,272,061 B1 * | 9/2012 | Lotem | H04L 63/1416 |
| | | | 709/224 |
| 2003/0182582 A1 * | 9/2003 | Park | H04L 63/1433 |
| | | | 703/21 |

(Continued)

OTHER PUBLICATIONS

Sushil Jajodia, Advanced Cyberattack Modeling, Analysis, and Visualization, AFRL-RI-RS-TR-2010-078 Final Technical Report, Mar. 2010, George Mason University, Air Force Research Laboratory Information Directorate Rome Research Site, Rome, New York.

(Continued)

*Primary Examiner* — Amie C. Lin
(74) *Attorney, Agent, or Firm* — Meister Seelig & Fein LLP; Seth H. Ostrow, Esq.

(57) ABSTRACT

A system for analyzing a computing system for potential breach points, the system comprising a memory device having executable instructions stored therein, and a processing device, in response to the executable instructions, configured to parse a breach scenario file, the breach scenario file comprising a graph including action component nodes connected by edges, determine a root node from the action component nodes, execute the root node with breach point data, generate a root node return value based on the execution of the root node, the root node return value including a modified copy of the breach point data, determine children nodes from the action component nodes connected to the root node, execute the children nodes wherein each execution of the children nodes produces children node return values for a subsequent one of the children nodes, and return a final return value from the execution of the children nodes.

27 Claims, 9 Drawing Sheets

Related U.S. Application Data continuation of application No. 14/691,150, filed on Apr. 20, 2015, now Pat. No. 9,892,260.

(51) Int. Cl.
*G06F 12/16*     (2006.01)
*G08B 23/00*     (2006.01)
*G06F 21/57*     (2013.01)

(56) References Cited

U.S. PATENT DOCUMENTS

| | | |
|---|---|---|
| 2009/0007270 A1 | 1/2009 | Futoransky et al. |
| 2010/0058456 A1 | 3/2010 | Jajodia et al. |
| 2013/0347085 A1* | 12/2013 | Hawthorn ............. G06F 21/577 726/6 |
| 2015/0051893 A1 | 2/2015 | Ratcliffe, III et al. |
| 2015/0106941 A1 | 4/2015 | Muller et al. |
| 2015/0295948 A1* | 10/2015 | Hassell ............... H04L 63/1433 726/25 |

OTHER PUBLICATIONS

Henk Birkholz et al., Enhancing security testing via automated replication of IT-asset topologies, 2013 International Conference on Availability, Reliability and Security, Sep. 2, 2013, pp. 341-349.
European examination report of Application No. 16783722.8, dated Mar. 16, 2021, European Patent Office.
European search report of Application No. 16783722.8, dated Dec. 3, 2018, European Patent Office.

* cited by examiner

SYSTEM AND METHOD FOR CREATING AND EXECUTING BREACH SCENARIOS UTILIZING VIRTUALIZED ELEMENTS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

The invention described herein generally relates to a computer protection system, and in particular, a system for detecting and protecting against threats from malware vulnerabilities by simulating malicious actions, analyzing the results, and applying or suggesting remediation.

Description of the Related Art

Computing devices have increasingly become repositories for sensitive data of corporations and users. This has given rise to malicious users who try to gain access to these computing devices. Additionally, malicious users often attempt to install programs that track user interactions or utilize the computing resources of computing devices for malicious purposes. The Internet today is a breeding ground for criminal activity. Home users, small and medium businesses, international corporations and governmental bodies all suffer from constant attacks cause by malware such as viruses and Trojans. Malware, short for malicious software, is any hostile or intrusive software used to disrupt computer operation, gather sensitive information, or gain access to private computer systems. It can appear in the form of executable code, scripts, active content, and other software.

Malware can steal personal and corporate bank account information, steal credit card numbers, conduct distributed-denial-of-service (DDoS) attacks with the instigators then demanding money to stop the attacks—a cyber racket, create networks of Trojan proxy servers (these can be used to send spam, and for commercial gain), create zombie networks, which can be exploited in multiple ways, create programs which download and install adware to the victim machine, install Trojan dialers which will repeatedly call pay services, etc. Consequently, anti-malware software has been developed to block these malicious users from gaining access to computing devices. However, malicious users continually attempt to circumvent the protection that anti-malware software provides. Malware has gotten more sophisticated and there is thus a need for new and advanced system and methods for securing against vulnerabilities to breaches from malware.

SUMMARY OF THE INVENTION

The present invention provides a method and system for protecting a computing system. The system comprising a memory device having executable instructions stored therein and a processing device, in response to the executable instructions, operative to allocate simulator nodes, the simulator nodes emulating operations of devices in a target system, simulate malicious action utilizing the simulator nodes, and determine that the malicious action was successful.

The simulator nodes may include at least one of virtual machines, virtual appliances, operating environments, and physical devices. In one embodiment, the simulator nodes are configured to virtualize or clone at least one of hardware, software, cloud computing, network and communication elements. The simulator nodes may also be operable to establish communication connections.

In another embodiment, the processing device is operative to configure a security system of the target system based on the simulation of the malicious action. The security system may also include one or more security controllers. In a further embodiment, the one or more security controllers includes at least one of firewall products, antivirus products, endpoint security products, web application firewall (WAF) products, access control list (ACL) features of network products (e.g., switches, routers, proxies and etc.), data leakage prevention (DLP) products, mobile device management (MDM) products, mobile access management (MAM) products, and content inspection products.

The processing device of the system may be further operable to configure the security controller, and re-simulate the malicious action. The malicious action may comprise a breach scenario. The breach scenario may include a plurality of operations performed by the simulator nodes. According to another embodiment, the processing device of the system is further operable to update a snapshot of currently known breaches with the determination that the malicious action was successful, the snapshot comprising a graph including nodes representative of simulator nodes and edges representative of specific scenarios and simulation results of the specific scenarios, determine whether the snapshot has new breach scenarios and previously known scenarios that have been fixed, and conclude the new breach scenarios and the previously known scenarios that have been fixed by searching the graph.

In another aspect, the system for protecting a computing system comprises a memory device having executable instructions stored therein and a processing device, in response to the executable instructions, operative to prepare breach simulation tasks by reading configurations for types of breach scenarios and preparing a list of tasks to be simulated, send breach simulation tasks to simulator nodes, the simulator nodes simulating parties involved in the types of breach scenarios, execute the breach simulation tasks on the simulator nodes, receive results from the simulator nodes, determine that the parties report on a same result, determine that the parties report on successful results, and identify a successful breach based on the parties report on the same result and the parties report on the successful results.

The parties may include at least one of client devices and servers. According to one embodiment, the processing device is further configured to determine proper execution of the breach simulation tasks, and verify data received by the parties and data transmitted from the parties are consistent with a breach. In another embodiment, the processing device is further configured to verify the data received by the parties and the data transmitted from the parties are identical. The breach scenarios may comprise sequences of moves executed on the simulator nodes with specific configurations and data assets. The processing device may be further configured to send the breach simulation tasks to the simulator nodes by generating one or more virtual devices configured to perform the breach simulation tasks. Breach simulation tasks may include data transfers, file modifications, change in system configuration, and changes to access permissions. The results received from the simulator nodes may include a hash of transferred and received data.

According to another aspect, the system for protecting a computing system comprises a memory device having executable instructions stored therein and a processing device, in response to the executable instructions, operative to parse a breach scenario file, the breach scenario file comprising a graph including action component nodes connected by edges, determine a root node from the action component nodes, execute the root node with breach point data, generate a root node return value based on the execution of the root node, the root node return value including a modified copy of the breach point data, determine children nodes from the action component nodes connected to the root node, execute the children nodes wherein each execution of the children nodes produces children node return values for a subsequent one of the children nodes, and return a final return value from the execution of the children nodes.

The root node return value may be representative of a result from the execution of the root node. According to another embodiment, the processing device is further configured to generate the root node return value by modifying the breach point data. In a further embodiment, the processing device is further configured to modify the breach point data by at least one of adding new keys, deleting key, and changing key values. Certain embodiments may include the processing device further configured to generate the root node return value by generating a false return value upon an unsuccessful execution of the root node. Action component nodes may include executable instructions for execution of breach tasks. The processing device can also be further configured to establish the root node as a first step among the action component nodes. The breach point data may comprise a data structure including keys and values and generally includes information for executing the action component nodes. The values can contain Internet protocol (IP) addresses, ports, data, protocols, and filenames that are accessible by the keys.

Embodiments of the present invention may be used to protect systems against malicious actions. Additionally, embodiments of the present invention can quantify risk by identifying what types of malicious actions are possible on a system and their impact. Further, system administrators may validate security controllers and determine which security controllers are effective or ineffective in providing protection to a system.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

Figure 1:
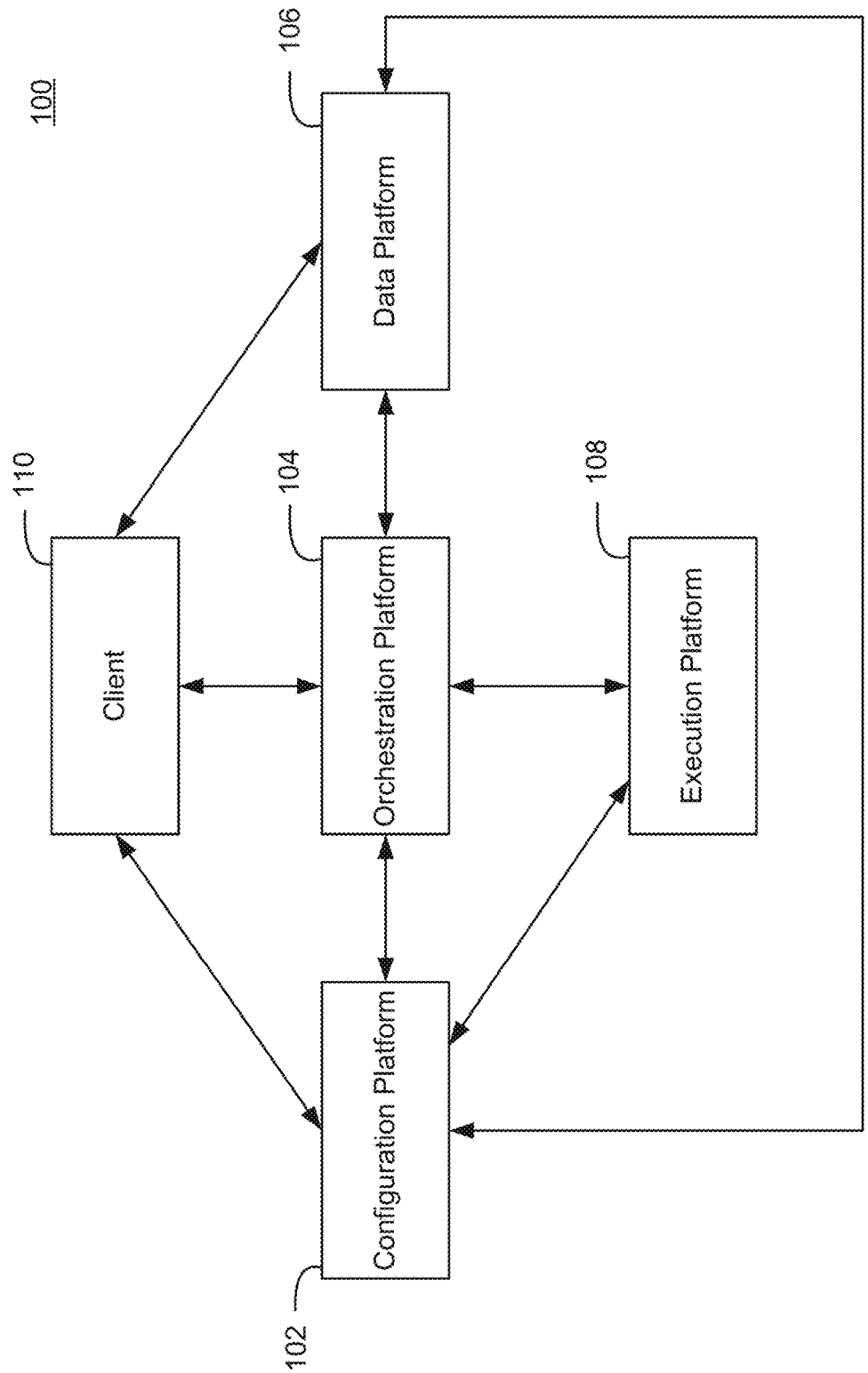
FIG. 1 illustrates a computing system according to an embodiment of the present invention.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The following describes certain terminology that are referred to in the present application:

a malicious action—as used herein, is generally intended to include an action executed by an attacker as part of a breach scenario;

breach scenario (or simply referred to as a breach)—as used herein, is generally intended to include one or more malicious actions that represent a scenario that was found successful from an attacker point of view (e.g., by playing a sequence of moves in a scenario on one or more defined devices) and violating a security policy;

scenario—as used herein, is generally intended to include a sequence of playbook moves executed over specific devices (e.g., by simulation) in attempt to violate a security policy (e.g., from device A, exploit operating system (OS) vulnerability on device B to run a remote process that will read finance report file from the local disk, encrypt it using some given key, and send it as attachment by using Gmail Simple Mail Transfer Protocol (SMTP) service to a given email address);

playbook move (or simply referred to as a move)—as used herein, is generally intended to include a sequence of building blocks that could be executed by an attacker on a single device or between a plurality of devices (e.g., encode a file using base64 encoding, and send it over Transmission Control Protocol (TCP) port 80 to an external server on the Internet;

building block—as used herein, is generally intended to include an action that could be executed by an attacker (e.g., open TCP socket to specific server on specific port);

device—as used herein, is generally intended to include anything that is capable of executing or running a code, programming instructions (examples of devices include desktop computers, laptop/notebook computers, mobile devices, smartphones, servers, printers, routers, etc.);

asset—as used herein, is generally intended to include any digital file or data that is considered proprietary by the company, and should be protected (examples of assets include employees details and human resources (HR) records, customers' credit card records, customers' personally identifiable information (PII), code, financial records, internal documents, company emails, partners records, etc.);

security policy—as used herein, is generally intended to include constraints on data, flow and access of a party's or individual's digital assets and systems;

fix recipe (or remedy)—as used herein, is generally intended to include a configuration or an action that could be taken by a system administrator of a system in order to prevent a playbook move from succeeding. Each move can have any number of fix recipes. An example of a fix recipe may include adding a rule to a firewall to block a port between two sub networks;

red, green, blue—as used herein, is generally intended to refer to describing for example, red describes the attacker side, green describes the attacked side, and blue describes a fix;

security campaign—as used herein, is generally intended to include a set of configurations that describes a subset of a security policy and assets, for which there is a business/personal driver to analyze and protect.

threat level—as used herein, is generally intended to describe a sophistication level of an attacker that is needed in order to perform a playbook move. A higher threat level may indicate a lower sophistication (e.g., a non-sophisticated attacker that is capable of carrying out a move imposes a high level of threat to a system); and accepted risk—as used herein, is generally intended to refer to a playbook move that is acceptable by the system administrator or end-user of a system and will not be blocked (e.g., an open share folder on a network server to which there is access from the corporate subnet).

The present invention according to embodiments described herein provide a protection system(s) and methods of using thereof for predicatively detecting and preventing threats such as data breaches, malware, compliance violation and any security event that could be described through a workflow. Specifically, the systems and methods simulate breach scenarios and hacker activity to detect system vulnerabilities. Simulations of breach scenarios and hacker activity may be created by building and running attack workflows, compliance/policy validation workflows, malware simulation or any other security events. Breach scenarios may be created to effectively simulate the actions of a malicious user or hacker. Scenarios may employ one or more simulator nodes or devices within and/or without a network (e.g., of a company) to execute scenarios and report potential vulnerabilities. The scenarios may be carried out at the application-layer but may also be implemented on lower layers of the Open Systems Interconnection (OSI) model.

The protection system can be configured to simulate malicious actions, analyze the results, and apply or suggest remediation. By doing so, a system administrator of a computing system can get a true picture of open breaches in their system and quickly fix them. According to embodiments of the present invention, system administrators may create, edit, and configure breach scenario workflows and "play" them within any network, end point or application. A simulation playbook, suite, package, or menu may be updated with new scenarios created by a provider of the protection system, third party vendors and by end-users. The protection system can generate virtual appliances, control devices, configure system behavior and settings and be deployed within a networked computing environment; however, the technology is not limited to network-based scenarios and can be deployed on a PC, mobile device and cloud applications as well. Additionally, the malware system may be either an enterprise business product or a consumer personal product.

FIG. 1 presents a computing system according to an embodiment of the present invention. Computing system 100 provides for malware protection services, and operation of the computing system 100 can be employed (or one or more components of the computing system 100 may be implemented or deployed) on a target system to be protected. A target system may be a single client device, a network of client devices, one or more servers, databases, networking equipment, printers, or any device and combinations thereof. Client devices may comprise computing devices (e.g., desktop computers, television set top boxes, terminals, laptops, personal digital assistants (PDA), cell phones, smartphones, tablet computers, e-book readers, or any computing device having a central processing unit and memory unit capable of connecting to a network). Client devices may also comprise a graphical user interface (GUI) or a browser application provided on a display (e.g., monitor screen, LCD or LED display, projector, etc.). A client device may vary in terms of capabilities or features. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games. A client device may include or execute a variety of operating systems, including a personal computer operating system, such as a Windows, Mac OS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples.

Servers, as described herein, may vary widely in configuration or capabilities but are comprised of at least a special-purpose digital computing device including at least one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like. A server is operative to receive requests from client devices and/or other servers and process the requests to generate responses across one or more networks.

A network, as described herein, may be any suitable type of network allowing transport of data communications across thereof. The network may couple devices so that communications may be exchanged, such as between servers and client devices or other types of devices, including between wireless devices coupled via a wireless network, for example. A network may also include mass storage, such as network attached storage (NAS), a storage area network (SAN), cloud computing and storage, or other forms of computer or machine readable media, for example. In one embodiment, the network may be the Internet, following known Internet protocols for data communication, or any other communication network, e.g., any local area network (LAN) or wide area network (WAN) connection, cellular network, wire-line type connections, wireless type connections, or any combination thereof.

Figure 2A:
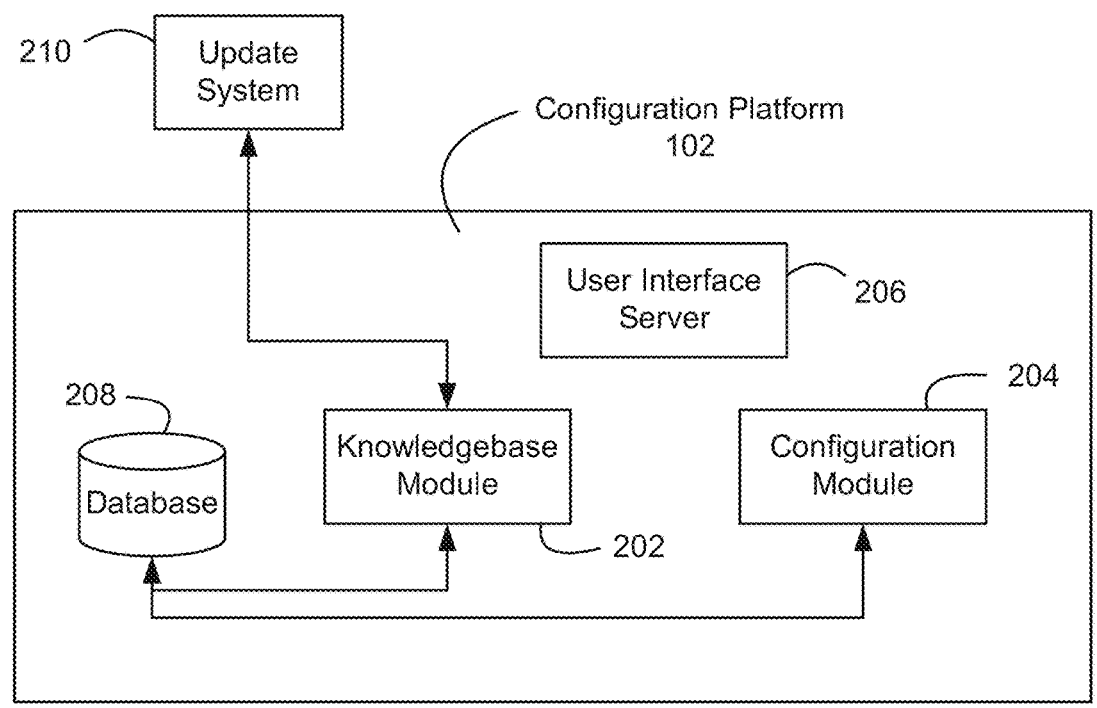
FIG. 2A illustrates a configuration platform system according to an embodiment of the present invention.

Referring to FIG. 1, the computing system 100 comprises a configuration platform 102, orchestration platform 104, data platform 106, execution platform 108, and client 110. Configuration platform 102 may be configured as a storage container where the other platforms are able to communicatively connect with configuration platform 102 to read data such as system configuration data and knowledgebase data. The configuration platform 102 may expose application program interfaces (APIs) for create, read, update and delete ("CRUD") operations on the data. FIG. 2A presents the configuration platform system according to an embodiment of the present invention. Configuration platform 102 comprises knowledgebase module 202, configuration module 204, user interface server 206, and database 208. Configuration module 204 comprises an interface operable to read and write (into database 208) configuration aspects of the system including users and roles, security policies, data assets, live notifications setting, user preferences, etc. Knowledgebase module 202 comprises an interface operable to read and write (into database 208) simulation and prevention knowledge of the system such as breach scenarios and fix recipes. Remediation history may also be stored into database 208 by knowledgebase module 202. The knowledgebase module 202 may be configured for consumption by orchestrator platform 104 for generating simulation tasks and fix tasks.

User interface server 206 is operable to serve client 110 to a web browser on a client device (of a system administrator or end-user) and provides at least a login process. Client may be a mobile client, a WINDOWS client, or a Web client, and so on. New scenarios and fix recipes may be updated via an update system 210. Update system 210 may be hosted as a cloud service or on a server that can be accessed automatically (e.g., "auto update" mode), semi-automatic (e.g., "update now" button), and/or manually (e.g., download update file and upload it manually into database 208). Update system 210 may provide scenario workflows and fix recipes that can be downloaded (e.g., as a subscription or for free) from a provider of the protection system, private hackers or from third party vendors. Services provided by update system 210 may be consumed by knowledgebase module 202. Alternatively, end-users may create new scenarios in an editor tool in a user interface (described in further detail with respect to the description of FIG. 7), or via an API.

Figure 2B:
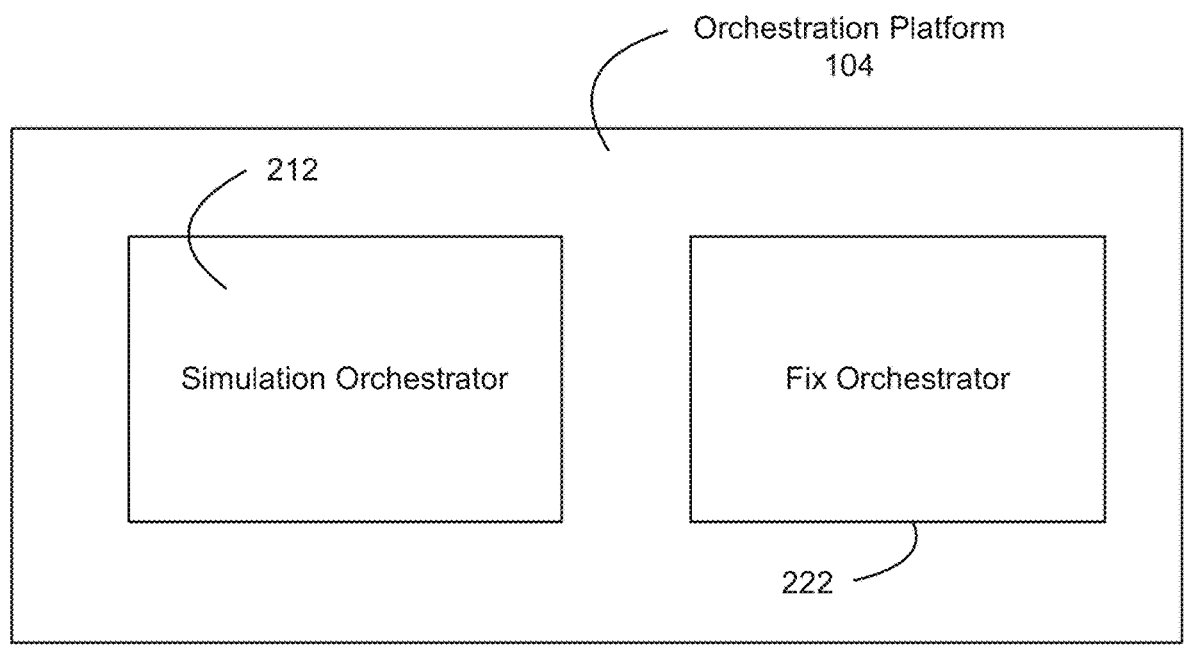
FIG. 2B illustrates an orchestration platform system according to an embodiment of the present invention.

FIG. 2B presents an orchestration platform system according to an embodiment of the present invention. Orchestration platform 104 may be configured to serve as a task manager between various components of the computing system 100. Exemplary functions of orchestrator platform 104 include generating simulation tasks, analyzing breach events and generating remediation tasks. Orchestration platform 104 comprises simulation orchestrator 212 and fix orchestrator 222. Simulation orchestrator 212 is operable to generate red and/or green tasks.

The simulation orchestrator 212 may be configured to read scheduling configuration from the configuration module 204 and breach scenarios from knowledgebase data from knowledgebase module 202 (e.g., via APIs). A scheduler may "wake" the simulation orchestrator 212 every time a campaign should run. That is, the scheduler can determine when to run tasks related to specific campaigns and notify the simulation orchestrator 212.

Simulation orchestrator 212 may also manage processes associated with generating tasks by delegating to a breach generator and a task maker, and sending simulation tasks from the task maker to the execution platform 108. The simulation orchestrator 212 may also expose an external API for controlling tasks such as running and halting one, a plurality, or all tasks. Simulation orchestrator 212 may be configured to call the breach generator and instruct it to generate simulations required for a given campaign. The breach generator is operable to read security policy and campaign configuration from the configuration module 204 (e.g., via API), read scenarios from knowledgebase module 202 (e.g., via API), and generate a matrix of simulations to be run or executed. Based on a list of simulator nodes and campaign settings read from the configuration module 204 and based on the scenarios read from the knowledgebase module 202, breach generator is able to generate a list or matrix of simulations to run. An example of a simulation may be to "use asset X in scenario Y, and run it on simulator nodes A and B." The breach generator may then return the list of simulations to simulation orchestrator 212.

The simulation orchestrator 212 may then call the task maker and instruct it to generate tasks for the list of simulations. The task maker is operable to receive simulations from the breach generator, read data assets from the configuration module 204 (e.g., via API), and compile red and green scenarios as tasks based on the simulation matrices and data assets. The task maker uses assets it reads from configuration module 204 and the data in the list to compile and generate tasks that can run on the simulator nodes. The tasks may then be returned to the simulation orchestrator 212 of which they can be sent to an execution manager (on execution platform 108) for execution.

Fix Orchestrator 222 is operable to generate blue tasks. According to one embodiment, fix orchestrator 222 includes learning features that attempt a remediation and re-run simulations in order to find the right remediation for a breach (which is described in further detail regarding the description of FIG. 8). Similar to the operation of simulation orchestrator 212, fix orchestrator 222 may operate as a manager for processes associated with generating tasks for fix orchestrator 222 by delegating to a decider, a fix generator and a task maker (which may or may not be the same task maker as described for simulation orchestrator 212), and sending fix or remediation tasks generated by the fix generator to the execution platform 108.

A task manager may read breach events from a queue and call a decider to decide a remedy. For example, a breach event is read from the queue which indicates that a breached node A opens port 21 and sends malware via FTP to node B. Node B is able to activate malware locally and the malware reads local file (asset) and sends it via email to an unknown Gmail account. The queue may be, but not limited to, a communication system that transfers data associated with one or more events between components inside a computing device, or between computing devices and systems. The queue covers all related hardware components (wire, optical fiber, memory, etc.) and software, including communication protocols.

The decider may be configured to receive the breach events from fix orchestrator 222. The decider is able to read remediation history and fix recipes from data platform 106, and based on the history data and the fix recipes, the decider is able to decide on a remedy to attempt (next remedy if a previous remedy was attempted and unsuccessful based on the remediation history). The decider may call the fix generator to decide how to implement a given remedy.

The fix generator is able to read configuration data from the configuration module 204 (API) and the decision from the decider, and determine how to implement the remediation with a fix recipe. For example, the decider may send a decision to the fix generator for blocking port 21 between two specific segments in the firewall. The fix generator may generate a fix recipe including a configuration file for a CISCO firewall on the target system and provide instruction(s) to deliver the configuration file via syslog. The fix recipe may then be sent to the task maker. The task maker is operable to "wrap" the fix recipe generated from the fix generator into a fix task that can run in a given gateway node. Fix orchestrator 222 may receive the fix task and send it to an execution manger (on execution platform 108) for implementation. For example, task maker receives an instruction from the fix generator that a Cisco configuration file is to be sent to a target system via syslog. The task maker may generate a task addressed to the right syslog gateway with all the needed parameters for the target system.

Upon performing a fix task by an execution manager, a fix event may be emitted to the queue. Fix orchestrator 222 is also able to read fix events from the queue and communicate them to decider. The decider decides if and which simulations have to re-run (to verify functionality of a fix task) and returns a response to fix orchestrator 222. Fix orchestrator 222 may call simulation orchestrator 212 of the simulation orchestrator 212 and instructs it to re-run a given scenario corresponding to a fix task.

Figure 2C:
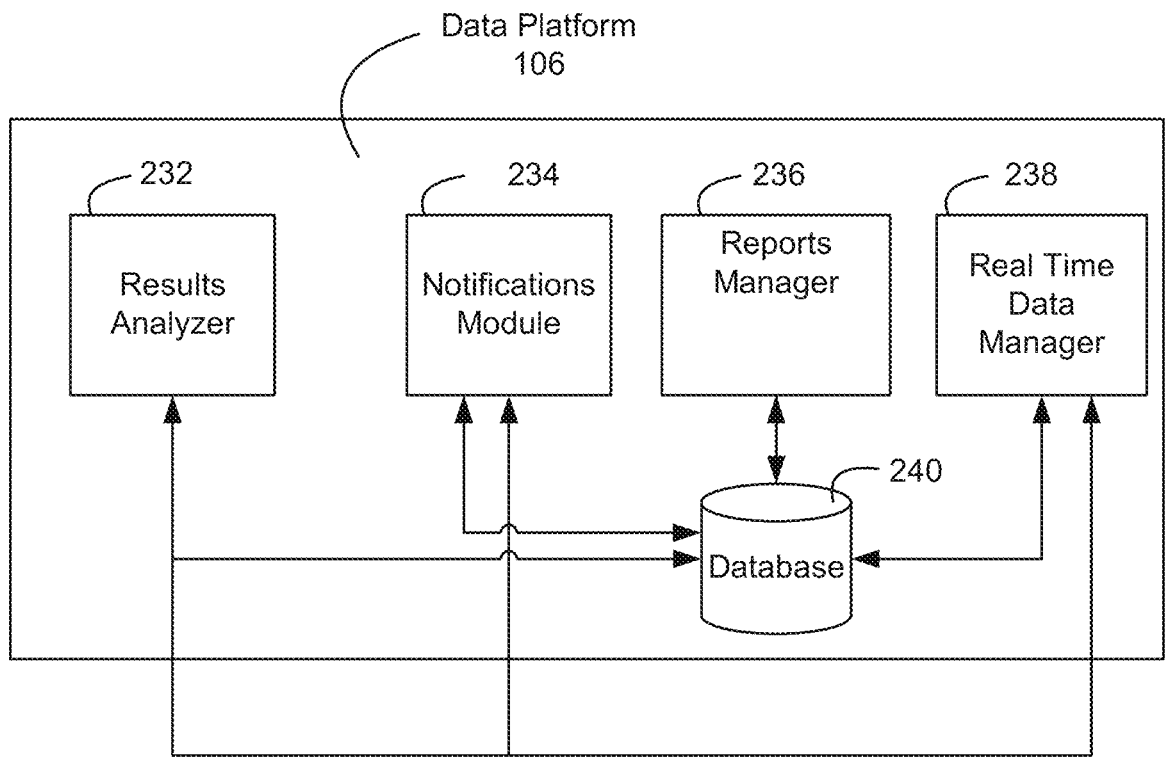
FIG. 2C illustrates a data platform system according to an embodiment of the present invention.

FIG. 2C presents a data platform system according to an embodiment of the present invention. Data platform 106 may be configured to aggregate and expose business data and intelligence to other components and/or platforms of the computing system 100. The business data and intelligence may include techniques and tools for the transformation of simulation results and breach events into meaningful and useful information for analysis purposes. The data platform 106 may analyze raw simulation events from the queue, identify full breach scenarios, and identify or produce breach scenario events. In one or more embodiments, data platform 106 may further provide reporting, online/cloud analytical processing, analytics, data mining, process mining, complex event processing, benchmarking, predictive analytics and prescriptive analytics.

Data platform 106 includes results analyzer 232, notifications module 234, reports manager 236, real time data manager 238, and database 240. Results analyzer 232 is operable to read simulation results (produced by execution platform 108) from the queue, update an in-memory graph, and search the graph for new breaches or existing breaches that were fixed. The in-memory graph may include simulator nodes as nodes on the graph and specific scenarios with their simulation results as edges. For example, an edge between two simulator nodes A and B can represent a successful simulation that sent asset X using scenario Y. Results analyzer 232 is able to perform searches on the graph to find new breaches and emit breach events for each breach it finds. For example, breached simulator node A can execute code on simulator node B using scenario X; node A can then take asset Y from node B, and send it to the Internet represented by node C using scenario Z. Results analyzer 232 is also able to perform searches on the graph to see if previously found breaches are now closed and emits a "breach heal event" for each breach that was closed.

For every such breach that was found or fixed, results analyzer 232 writes them to the database 240 and emits breach events to the queue. In addition, results analyzer 232 may write raw simulation events or data to the database 240. Notifications module 234 is operable to reads notifications configurations from the configuration API (configuration module 204), read breach events from the queue, and create notifications. Notifications may be published via SMS or email, or exposed to a user interface (e.g., user interface server 206) via an API. Reports manager 236 may be configured to generate business reports as requested via an API, or automatically by a scheduler, in which case it may publish reports via email. Various types of business reports may be generated including impact reports, trends reports, and technical reports.

Impact reports can describe business impacts from certain malicious activities. Examples of impacts may include leaked credit cards, breached active directory, infiltration into the organization, etc. An impact report may include a current state per impact described by, for example, a number of breach scenarios, surface of attack, and impact magnitude. The number of breach scenarios may indicate how many different breach scenarios exist to create the impact. Surface of attack may be a statistical measurement of the number of successful actions out of a total number of actions (e.g., malicious activities) simulated for the different breach scenarios. The impact magnitude can indicate a measure or size of an impact under one or more breach scenarios. For example, an impact magnitude for a hacker leaking credit card numbers may be calculated by a number of credit card numbers that could be leaked by successful breach scenarios. Under a first breach scenario, 10 thousand card numbers may be at risk while under a second breach scenario, 100 thousand card numbers may be at risk. Using a worst-case scenario, the impact magnitude may be a maximum number of card numbers at risk between the two breach scenarios (100 thousand card numbers at risk).

A trends report may show trends per impact item. Trends may be shown by a chart, graph or visualization of data points over a period of time such as for number of breach scenarios, surface of attack, and impact magnitude.

Technical reports may show a breakdown (e.g., using histograms) of successful actions into different parameters. Exemplary parameters include protocol (what protocol was used, e.g., SSH, TCP, HTTP, SMTP, etc.), attacker level (what level of sophistication is required to carry the action, e.g., script kiddy, cyber crime, state backed organization), and approach (e.g., malware, brute force, exploit, etc.). The technical reports may be filtered by specific actions prior to generating a breakdown, for example, show only actions related to data leak.

Real time data manager 238 may be configured to expose real time data of the computing system 100 to one or more components or platforms. The real time data manager is capable of reading events from the queue in addition to some of the aggregated data in the database 240 to generate the real time data and expose the data in an API. Examples of real time data may include the running of simulations, fixes, updates, etc. Real time data may be utilized by components such as a dashboard in the client 110.

Figure 2D:
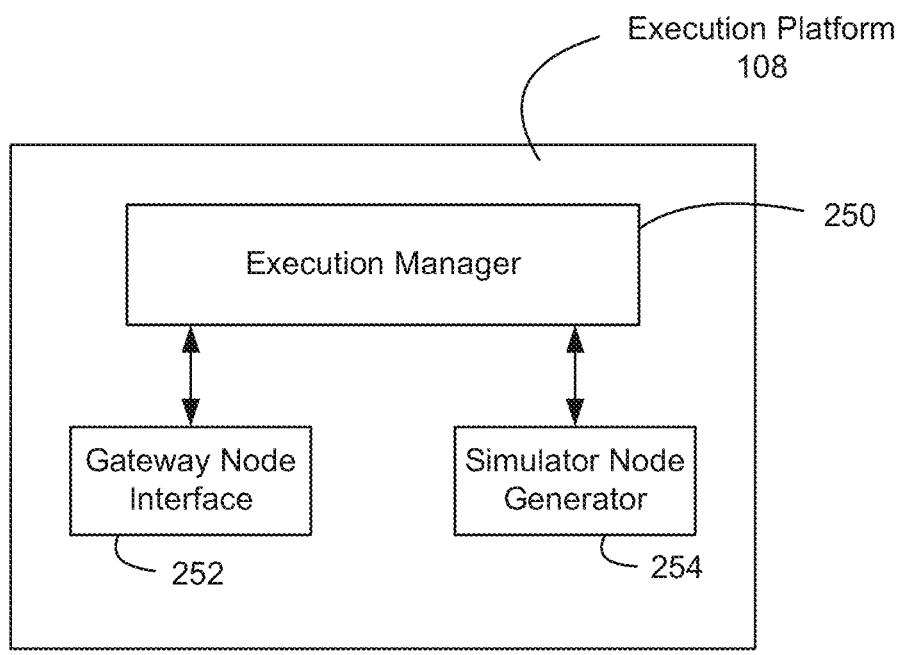
FIG. 2D illustrates an execution platform system according to an embodiment of the present invention.

FIG. 2D presents an execution platform system according to an embodiment of the present invention. Execution platform 108 may be configured to perform the execution of or running of tasks received from simulation orchestrator 212 and fix orchestrator 222. According to one embodiment, components within execution platform 108 may create simulator nodes, manages the nodes' resources, run simulations and execute fixes. A simulator node, as used herein, may refer to an instance of a virtual machine, virtual appliance, operating environment, agent, client, server, a physically installed device or any other emulation device or system that is capable of virtualizing and/or cloning devices, hardware, software, cloud computing, network and communication elements, etc.

Execution platform 108 includes execution manager 250, gateway node interface 252, and simulator node 254. Execution manager 250 can be configured to provide for the management of simulation and fix tasks. The execution manager 250 may expose an API that is consumed by the orchestrator platform 104 that allows for adding tasks, stopping a task, or stopping all tasks at the execution manager 250. Execution manager 250 may utilize a queue to add and remove pending simulation and fix tasks.

Execution manager 250 is operable to add simulation tasks received from simulation orchestrator 212 into a simulation task queue. The execution manager 250 is further capable of allocating simulator node resources. Simulator node generator 254 may be configured to accept simulation instructions from execution manager 250 and execute the simulation instructions. Specifically, simulator node generator 254 may generate or allocate one or more simulator nodes to simulate a scenario according to the simulation instructions. A simulator node could be deployed as a virtual appliance, agent (e.g., as a Linux daemon on a server in production or as a service on a Windows PC in the corporate network), appliance (hardware), or application (e.g., on a mobile device). Simulator nodes may be deployable to one or more computers or devices connected via one or more communication networks. Additionally, simulator nodes may also be distributed in different locations of a network in a target system so the computing system 100 can simulate complex attacks that move between various locations.

When simulator nodes are available for simulation of a given task, the execution manager 250 may pop the task from the queue and send red (attack) and green (receiving attack) instructions to the respective simulator nodes. A given simulator node may run an interpreter for the simulation instructions and utilize a library bundle that helps run the simulation instructions. Tasks on simulator nodes may lock the simulator nodes for new tasks which can be managed by the execution manager 250. Upon or during simulation, execution manager 250 may send statistic events to the queue which may be consumed by a real time data API (real time data manager 238) and reported to a dashboard (as e.g., "now running simulations"). In each simulation, each simulator node carries out its instructions. A node can act as a red side (attacker) or a green side (being attacked).

For example, a red simulator node may read a file from the disk, take the first four bytes, encode it using base64 encoding, try to open a port to the green simulator node and send those bytes to the open port using telnet. At the same time, the green simulator node listens on port 23 waiting for transmission. Once received, the green simulator node decodes the data using base64. At the end of a simulation, each node may report back its results to execution manager 250 and execution manager 250 may transmit a simulation result event to the queue of which, the simulation result may be consumed by the results analyzer 232. Using the same example, the red simulator node may send a hash of the four bytes that were sent to the green side to execution manager 250. The green simulator node may send a hash of the data it decoded to the execution manager 250. Execution manager 250 may compares both hashes and decide whether the simulation succeeded (the hacker managed to send the data), or failed.

Gateway node interface 252 is operable to provide gateways (nodes) to third party systems associated with a target system such as firewalls, data lost prevention (DLP) systems, a syslog server, an email server, short message service (SMS) gateway, etc. The gateway node interface 252 is able to run interpreters for gateway instructions and utilize a library bundle that helps run the gateway instructions. Gateway nodes may be distributed in different locations of the network to allow connectivity to the third party systems involved. A gateway node may be deployed as a virtual appliance, agent, or appliance (hardware), etc. In another embodiment, gateways may also be provided as cloud (service) gateways to services like email, SMS, etc., that can be consumed by gateway nodes in the execution platform in order to fulfill their requirements. When a relevant gateway node for a fix task is available, execution manager 250 may pop the fix task from a fix task queue and send it to the gateway node. Gateway nodes may send results to execution manager 250, and execution manager 250 may write fix events to the queue.

According to one embodiment, the execution platform 108 may be configured, deployed, or on the premises of the target system where resources of the target system may be used to perform the simulations and fixes. In an alternative embodiment, one or more components of the execution platform 108 (e.g., execution manager 250) may be embodied on a target system as a cloud service such that simulations may be performed on a cloned version of the target system on a cloud computing system and fixes may be transmitted to the actual target system based on the simulation on the cloned target system. In a further embodiment, one or more instances of the components (e.g., execution manager 250) of the execution platform 108 may be deployed in a plurality of locations, a plurality of target systems or within a given target system.

Figure 2E:
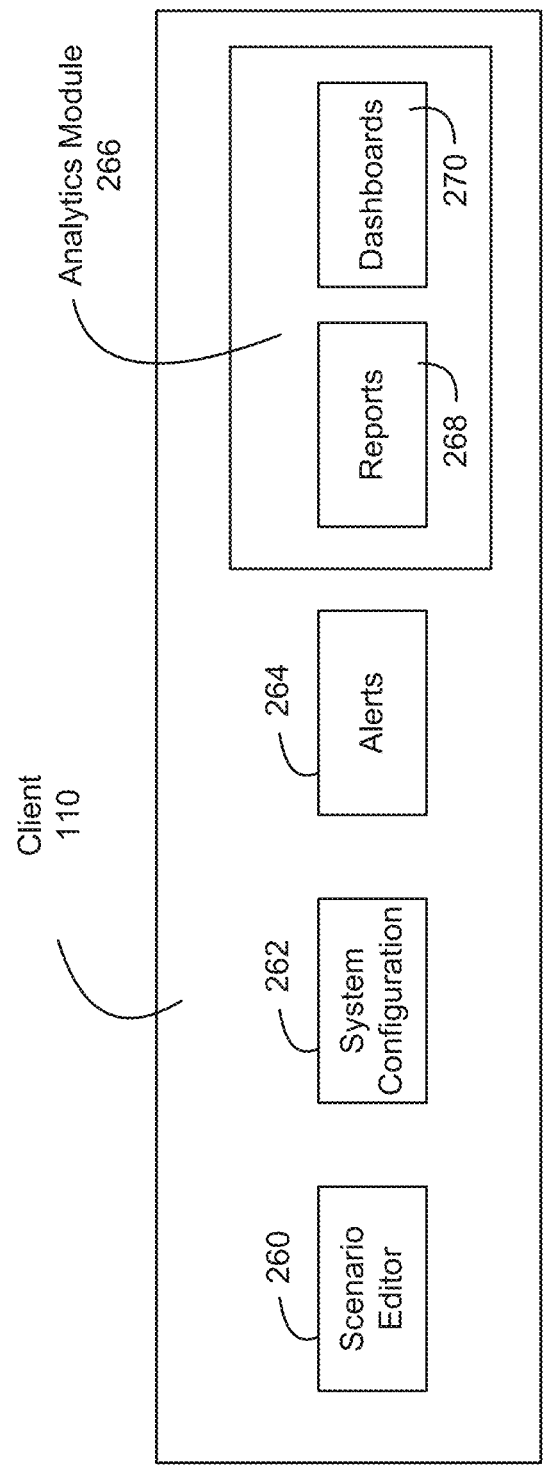
FIG. 2E illustrates a client system according to an embodiment of the present invention.

FIG. 2E presents a client system according to an embodiment of the present invention. Client 110 may be a server or cloud implementation configured to provide a main interface of the computing system 100 used for accessing analytics and configurations. The client 110 includes scenario editor module 260, system configuration module 262, alerts module 264, and analytics module 266. Modules (one or more of which may be user interfaces) within client 110 may be provided for a user to interact with the computing system 100. The client 110 may be provided to the user via a website or via a networked application installed on the target system.

System configuration module 262 may provide for the viewing and setting of the configuration of the system (e.g., corresponding to configuration module 204) such as users and role, security campaigns configuration, assets, etc. Alerts module 264 may be a user interface component operable to provide real time alerts that require the attention of a user. Analytics Module 266 may further include dashboards module 270 and reports module 268. The dashboards module 270 may provide real-time information or status. Reports module may provide answers to questions such as "what is the threat level that I'm currently facing in regards to my customers' credit cards data?" "what is the trend of the security level of R&D code in the last 6 months?" "is my PCI environment fully compliant with PCI standards? if not, what specifically has to be fixed?" and "is my system immunized against the same breach X that was recently published in the news in company Y? Scenario Editor module 260 is operable to allow system administrators or end-users create their own scenarios and add them to a playbook that can be simulated in their environment (target system).

According to embodiments of the present invention, computing system 100 may be deployed as a full on-premises solution, full cloud (SaaS) or hybrid. That is, one or more of the platforms and components described in FIG. 1 through 2E may be deployed, installed, or otherwise located at the target system (and installed on one or more devices within the target system), on a remote server or on a cloud platform. The platforms and components in different platforms can run as separate processes on the same server, or separated onto different servers. Furthermore, one or more instances of computing system 100 or its components (such as execution platform 108) may exist in a deployment for a target system. A first example may include configuration platform 102, orchestration platform 104 and data platform 106 provided on a cloud while execution platform 108 will be on premises of the target system. A second example may include configuration platform 102 and orchestration platform 104 provided on a cloud while data platform 106 and execution platform 108 will be on premises of the target system. In a third example, configuration platform 102 may be provided on a cloud while orchestration platform 104, data platform 106 and execution platform 108 will be on premises of the target system.

Figure 3:
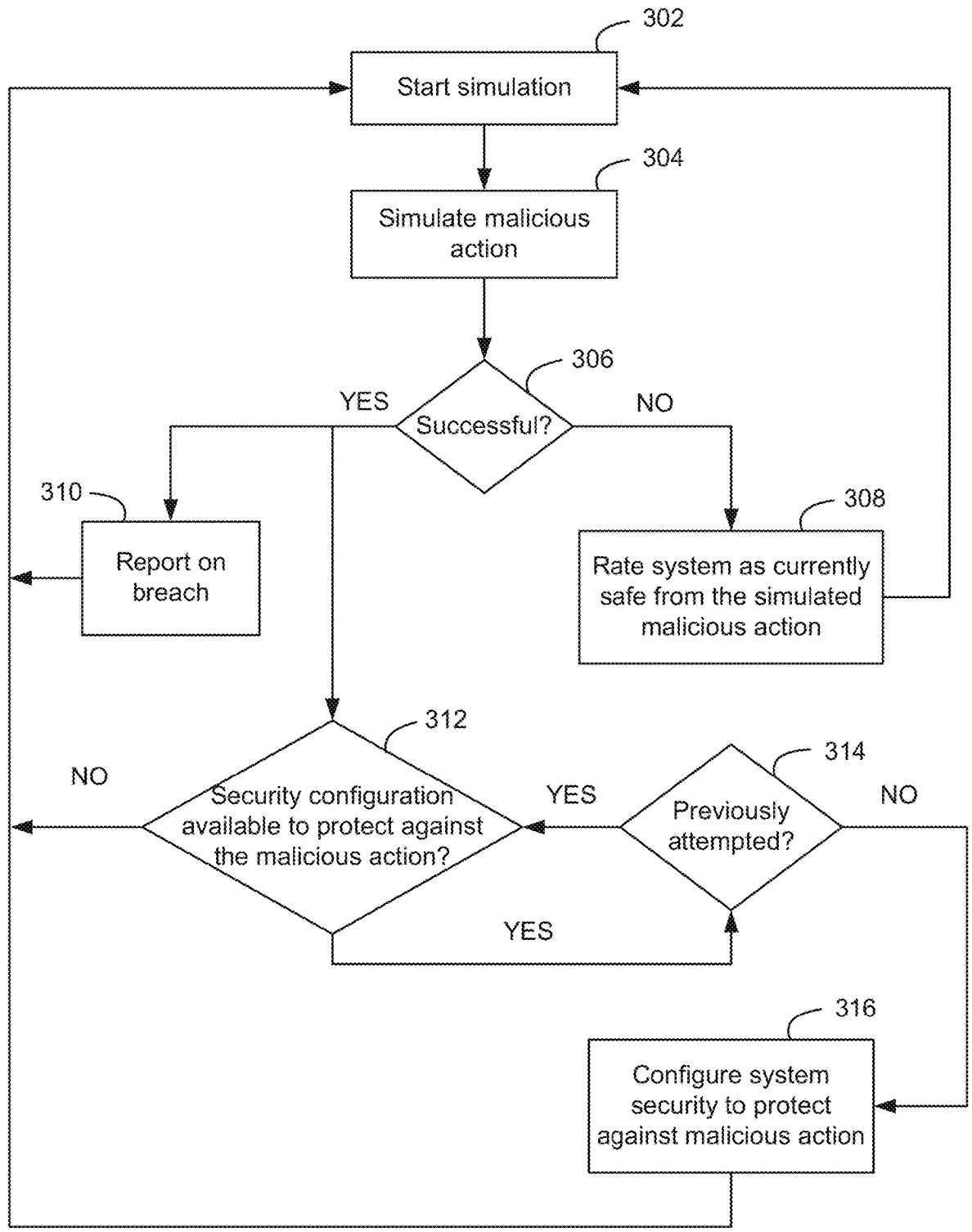
FIG. 3 illustrates a flowchart of a method for protecting a computing system according to an embodiment of the present invention.

FIG. 3 presents a flowchart of a method for protecting a computing system according to an embodiment of the present invention. The method provides for breach protection on a target system by simulating scenarios and using predictive prevention. Examples of possible scenario genres that can be simulated include exfiltration, infiltration, and policy validation. Deployment of the method (and associated system) may be carried out based on the need as a virtual appliance, in singular or multiple locations, within the network (corporate, production, and etc.) or externally when the goal is to simulate infiltration or external breach scenarios. To run a scenario, a user may be required to specify one or more simulation options such as what family of scenarios the user would like to use (e.g., data exfiltration, infiltration, malware, compliance or any other) and what internal or external simulator nodes should be part of the simulation. A user may be an end-user, a computer administrator, IT professional, or management personnel. For policy/compliance validation the user can define the policy to validate (e.g., access to a server only via virtual private network (VPN) or allow a remote user to access production only through a terminal server). For data exfiltration a user may be able to define what is confidential content by means of uploading actual templates and information into a simulator node (e.g., MS Word, source code, code names of products, etc.), by choosing dynamic real-time generators such as a fake person name, fake credit card, fake email, and etc., by choosing out of predefined data samples, or any combination thereof.

The method attempts to resolve breaches by systemically simulating breach scenarios and trying to apply different security controllers and configurations until a security policy is enforced. A simulation is started, step 302. The simulation may be configured according to simulation options selected by the user and started either on-demand, periodically as scheduled, in response to an update, or in response to a high threat warning that may be received from a provider of a protection/security system. Starting the simulation may include initializing or generating simulator nodes. The simulator nodes may be virtualized devices, systems, or cloud services, for example. Simulation can occur on a single node or between multiple nodes. In simulations including multiple simulator nodes, connections between the simulator nodes may also be established. The simulation may include processes and/or communications between one or more devices or of a single device connected to a network system/cloud service. A simulator node may connect to another simulator node as a proxy, or will try to access the Internet and reach an external entity.

Malicious action is simulated, step 304. The malicious action may be simulated on one or more devices (internal or external) via the simulator nodes. The simulated malicious action may comprise a breach scenario including one or more steps that contribute to a result that is harmful to the user or owner of the target system. According to one embodiment, multiple malicious actions may be simulated simultaneously. The system determines whether the malicious action was successful executed, step 306. Validation of successfully executed malicious action may be determined by any number of ways including determining the success of establishing a connection, determining the success of sending and receiving a series of data packages (e.g., reaching a certain state in the server-side), and applying metadata facts (e.g., check-sum, file size, regular expression, and etc.) sent over an encrypted out-of-band channel from one simulator node to another.

If the malicious action was not successful, the target system is rated as currently safe from the simulated malicious action, step 308. Otherwise, if the malicious action was successful, a breach is reported, step 310 and the protection system determines whether a security configuration is available to protect against the malicious action, step 312. The protection system may include one or more security controllers. Security controllers may be any product (technology) able to detect and mitigate one or more malicious actions that are executed as part of a breach scenario. Examples of security controllers include, but not limited to, firewall products, antivirus products, endpoint security products, web application firewall (WAF) products, access control list (ACL) features of network products (e.g., switches, routers, proxies and etc.), data leakage prevention (DLP) products, mobile device management (MDM) products, mobile access management (MAM) products, and content inspection products.

If a security configuration is available, a determination is made whether the configuration has been previously attempted, step 314. Previously attempted security configurations may be passed on and the method continues to determine if there are other security configurations that can protect against the malicious action. A lack of security configurations to protect against the malicious action may result in the method to continue on to simulating other malicious actions at step 302. However, if a security configuration is available that has not been previously attempted, the security controller is configured to protect against the malicious action, step 316. Configuring the security controller may include offering a mitigation path (manual or automated). Implementing a security configuration may include connecting to the security controller and configuring the security controller according to a specific security configuration. A given security controller may be selected and configured to resolve a vulnerability exposed by the simulation of the malicious action. In some embodiments, configuring a security controller may include displaying a recommendation on how to prevent the breach on a target system using a specific security controller product and providing an example configuration using the specified product, that once applied, will prevent the breach. A product may be made available for download or purchase to prevent the breach.

The method may repeat looping through one or more simulations to ensure that malicious action vulnerabilities are continuously detected and protected against at 302. For example, the system may re-simulate the malicious action to determine if the malicious action has been prevented against. Additionally, the method may re-simulate malicious actions with up-to-date security configurations (e.g., from updates to security software, etc.) where there were no security configurations to protect against in a previous simulation.

Figure 4:
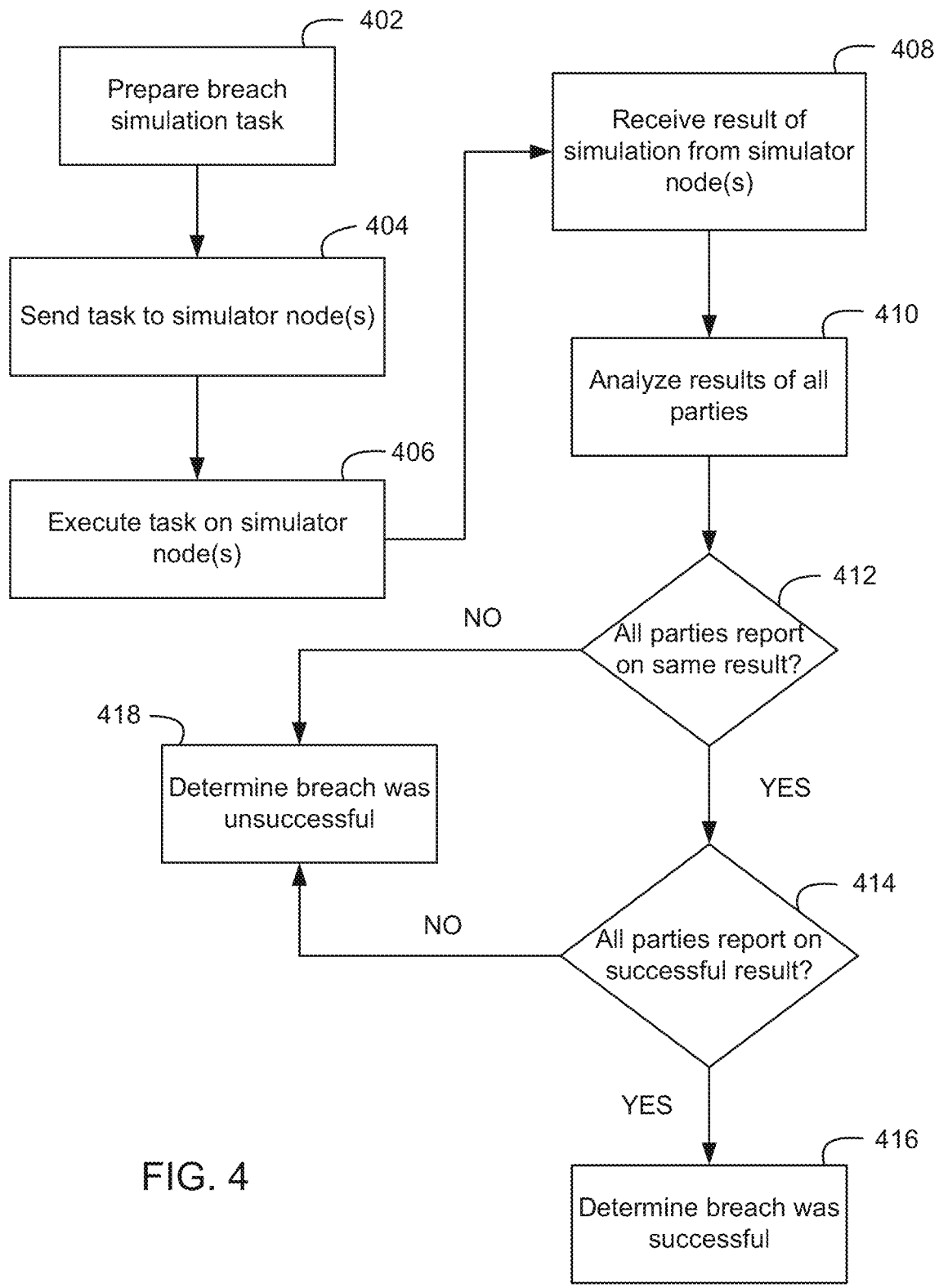
FIG. 4 illustrates a flowchart of a method for preparing a breach simulation for verification according to an embodiment of the present invention.

FIG. 4 presents a flowchart of a method for preparing a breach simulation for verification according to an embodiment of the present invention. The method allows for the verification of a breach by determining proper execution of breach tasks and whether data received and transmitted from all parties involved in a breach are consistent with a breach. For example, data that was sent from one device to another is verified whether the data is received as is (e.g., identical, the same, equal or substantially similar). Breach simulation task(s) are prepared by the simulation orchestrator, step 402. Preparing the breach simulation task(s) may include reading a configuration for a specific breach scenario type and preparing a list of tasks to be simulated, taking into account one or more moves in a playbook, one or more configured data assets, and simulator nodes in the system, etc. A breach scenario may comprise a sequence of one or more moves applied on the simulator nodes with specific configurations, data assets, etc. The simulation orchestrator can prepare tasks for all participating parties (characterized by simulator nodes) involved in a given simulation. A simulation can occur on a single simulator node or between multiple simulator nodes.

The following are exemplary breach scenarios that may be simulated according to the embodiments of the present invention:

Scenario 1.1—Activation/Update
Environment: Network
Description: Malware connects to a server (that also may, or may not be the command and control server) and downloads a configuration file. The protocol and configuration file format may vary, depends on the malware type and version.
Walk-through: Simulator A will simulate an infected computer with malware installed on it. Simulator B will simulate a server that is serving malware configuration file. Simulator A will try to connect to Simulator B via HTTP protocol and download the malware configuration file.

Scenario 1.2—Phoning Home/Command and Control Channel
Environment: Network
Description: When a malware wants to communicate with the attacker and to transmit back stolen credential or files, it will use a command and control channel that was setup for this purpose. The command and command channel may vary, depends on the malware type and version.
Walk-through: Simulator A will simulate an infected computer with malware installed on it. Simulator B will simulate a command and control channel server. Simulator A will try to connect to Simulator B via FTP protocol and upload an encrypted file that contains screenshots & logged keystrokes from the infected computer.
[or]
Simulator A will simulate an infected computer with malware installed on it. Simulator B will simulate a command and control channel. Simulator A will try to connect to Simulator B via IRC protocol and wait in an IRC channel for further commands from a "bot herder"/attacker.
[or]
Simulator A will simulate an infected computer with malware installed on it. Simulator B will simulate a command and control channel. Simulator A will try to connect to Simulator B via sending crafted ICMP ECHO_REQUEST packets and wait for further commands from the bot herder/attacker via crafted ICMP ECHO_REPLY packets.

Scenario 1.3—Stash Creation
Environment: Local
Description: When a malware is installed, it will create one or more files and/or directories and use it to store stolen credentials, keystrokes logging, screen captures and etc. before it will send it back to the attacker via the command and control channel. The file and directory names and locations on the file system may vary, depends on the malware type and version.
Walk-through: Simulator A will simulate an infected computer with malware installed on it. Simulator A will attempt to create one or more of the following hidden files and/or directories:

TABLE 1

| File | Description |
| --- | --- |
| C:\WINDOWS\system32\sdra64.exe | Trojan binary |
| C:\WINDOWS\system32\lowsec\local.ds | Contains the stolen data |
| C:\WINDOWS\system32\lowsec\user.ds | Contains the encrypted config |

Scenario 1.4—Infection/Running
Environment: Network & Local
Description: When a malware is installed, it will create one or processes for it to run, or, alternatively it will try to inject itself into another running processes in the system. In addition, malware may change system configuration in order to force the user to go through its filters/processes. The injection/creation method and processes names may vary, depends on the malware type and version.
Walk-through: Simulator A will simulate an infected computer with malware installed on it. Simulator A will create a dummy process called SVCHOST.EXE. Simulator A will attempt to inject a code into the dummy process called SVCHOST.
[or]
Simulator A will simulate an infected computer with malware installed on it. Simulator A will create a dummy process called SVCHOST2.EXE.

[or]

Simulator A will attempt to modify the HOSTS file and add a dummy malicious entry (e.g., resolve evil.com to 1.2.3.4).

Scenario 1.5—Abusing

Environment: Network

Description: Some malwares turn the computer that they are installed on into a "zombie" or "bot" that is part of a botnet. A botnet may be a collection of Internet-connected programs communicating with other similar programs in order to perform tasks. This can be as mundane as keeping control of an Internet Relay Chat (IRC) channel, or it could be used to send spam email or participate in distributed denial-of-service attacks.

Walk-through: Simulator A will open an email account (e.g., Google Mail, Yahoo!, Hotmail and etc.) and periodically check it for new mails. Simulator B will simulate a bot installed on a computer. Simulator B will connect to an SMTP server and attempt to send a spam email to Simulator A email account.

Scenario 2—Insider Threat (Data Leakage/Data Loss)

An Insider threat is a malicious threat to an organization that comes from people within the organization, such as employees, former employees, contractors or business associates, who have inside information concerning the organization's security practices, data and computer systems. The threat may involve fraud, the theft of confidential or commercially valuable information, the theft of intellectual property, or the sabotage of computer systems.

Scenario 2.1—Data Leakage via Network Connection

Environment: Network

Description: An employee tries to upload to an unauthorized online storage service (a.k.a. "Shadow IT") files with sensitive data.

Walk-through: Simulator A will connect to DROPBOX website. Simulator A will login to DROPBOX Account. Simulator A will upload file with sensitive data to DROPBOX (e.g., HTTP POST).

Scenario 2.2—Data Leakage via Physical Connection

Environment: Local

Description: An employee tries to copy sensitive data to unauthorized device (if there's a policy) or at all (if prohibited at all).

Walk-through: Simulator A will simulate an USB flash drive that is inserted into the computer. Simulator A will try to copy the sensitive files to the simulated USB flash drive.

Scenario 2.3—Data Leakage via Wireless Connection

Environment: Local

Description: An employee tries to pair an unauthorized device (if there's a policy) or at all (if prohibited at all) and then copy sensitive data to it.

Walk-through: Simulator A will simulate a BLUETOOTH device that is paired with the computer. Simulator A will try to send file via BLUETOOTH to the virtual device.

[or]

Simulator A will simulate a Wi-Fi access point on a given computer. Simulator A will attempt to connect to the simulated Wi-Fi access point. Simulator A will attempt to upload a file (via HTTP POST) to an endpoint that is exists on the simulated Wi-Fi access point network.

Scenario 3—Hacker

A hacker seeks and exploits weaknesses in a computer system or computer network. Hackers may be motivated by a multitude of reasons, such as profit, protest, challenge or enjoyment.

Scenario 3.1—Arbitrary Code Execution/Remote Code Execution/Remote Exploit

Arbitrary code execution is used to describe an attacker's ability to execute any commands of the attacker's choice on a target machine or in a target process. It is commonly used in arbitrary code execution vulnerability to describe a software bug that gives an attacker a way to execute arbitrary code. A program that is designed to exploit such a vulnerability is called an arbitrary code execution exploit. Most of these vulnerabilities allow the execution of machine code and most exploits therefore inject and execute shellcode to give an attacker an easy way to manually run arbitrary commands. The ability to trigger arbitrary code execution from one machine on another (especially via a wide-area network such as the Internet) is often referred to as remote code execution. The exploit and protocol may vary depending on the remote vulnerability.

Environment: Network

Description: Hacker tries to exploit a remote vulnerability

Walk-through: Simulator A will simulate a vulnerable HTTP server that has a buffer overflow problem in the GET method handler. Simulator B will connect to the vulnerable HTTP server and craft a malicious GET request in order to exploit the vulnerability.

[or]

Simulator A will simulate a HTTP server that serves an HTML page with exploit in it. Simulator B will simulate a vulnerable browser that connects to Simulator A HTTP server and renders the maliciously crafted HTML page with the exploit in it.

Scenario 3.2—Privilege Escalation/Local Code Execution/Local Exploit

Privilege escalation is the act of exploiting a bug, design flaw or configuration oversight in an operating system or software application to gain elevated access to resources that are normally protected from an application or user. The result is that an application with more privileges than intended by the application developer or system administrator can perform unauthorized actions.

Environment: Local

Description: Hacker tries to exploit a local vulnerability

Walk-through: Simulator A will simulate a service (daemon) running with administrator privileges that is vulnerable to insecure file creation vulnerability. Simulator A will attempt to exploit the vulnerable service via creation of multiple potential "temporary files" that includes malicious payload.

Scenario 3.3—Fuzzing

Fuzz testing or fuzzing is a software testing technique, often automated or semi-automated, that involves providing invalid, unexpected, or random data to the inputs of a computer program. The program is then monitored for exceptions such as crashes, or failing built-in code assertions or for finding potential memory leaks. Fuzzing is commonly used to test for security problems in software or computer systems.

Environment: Network & Local

Description: Hacker tries to fuzz SSH server by sending incomplete SSH handshake requests.

Walk-through: Simulator A will simulate a SSH Server. Simulator B will simulate a fuzzer that sends "broken" SSH requests. Simulator A will connect to the SSH server and start fuzzing.

Scenario 3.4—Scanning

A vulnerability scanner is a computer program designed to assess computers, computer systems, networks or applications for weaknesses. For example, a web application security scanner is a program, which communicates with a web application through the web front-end in order to identify potential security vulnerabilities in the web application and architectural weaknesses. It performs a black-box test. Unlike source code scanners, web application scanners don't have access to the source code and therefore detect vulnerabilities by actually performing attacks.

Environment: Network & Local

Description: Hacker attempts to find and exploit a SQL injection in a website

Walk-through: Simulator A will simulate a HTTP Server with an interactive form. Simulator B will simulate a SQL injection scanner. Simulator A will connect to the HTTP server and start "enumerating" different SQL injection attacks using the interactive form fields.

[or]

Simulator A will simulate an application within a container (e.g., Mobile Application Management Solution). Simulator B will simulate a server with exposed TCP port on production site. Simulator A will attempt to scan the simulated server and reach the open TCP port.

Scenario 3.5—Brute-force

In cryptography, a brute-force attack, or exhaustive key search, is a cryptanalytic attack that can, in theory, be used against any encrypted data (except for data encrypted in an information-theoretically secure manner). Such an attack might be used when it is not possible to take advantage of other weaknesses in an encryption system (if any exist) that would make the task easier. It is comprised of systematically checking at least one or all possible keys or passwords until the correct one is found. In the worst case, this would involve traversing the entire search space.

Environment: Network & Local

Description: Hacker tries to brute-force the administrator password

Walk-through: Simulator A generates a dummy administrator account (username with a random password). Simulator A tries to blindly brute-force the dummy username password (e.g., 0, 1, 2, 3, 4, . . . , A, B, C, D, . . . AA, AB, AC, and etc.).

Scenario 3.6—Dictionary Attack

In cryptanalysis and computer security, a dictionary attack is a technique for defeating a cipher or authentication mechanism by trying to determine its decryption key or passphrase by trying hundreds or sometimes millions of likely possibilities, such as words in a dictionary.

Environment: Network & Local

Description: Hacker tries to dictionary attack a company web portal.

Walk-through: Simulator A generates a dummy administrator account (username with a random password). Simulator A will simulate a HTTP server with a dummy login form. Simulator B will connect to the HTTP server and attempt to login with different passwords (e.g., 12345, abc 123, password, computer, 123456, tigger, 1234, a1b2c3, qwerty, 123, xxx, money, and etc.).

Scenario 3.7—Browsing and Enumeration

A resource enumeration attack is a type of attack in which an attacker is able to make the target host enumerate, or list, the various resources available on said host or network. Examples of these resources include user names and privileges, services, shares, policies, etc.

Environment: Network & Local

Description: Hacker tries to enumerate at least one or all open ports on a given server.

Walk-through: Simulator A will simulate a dummy service on random TCP port (e.g., 31337). Simulator B will port scan the server to determine which TCP ports are active.

[or]

Simulator A will simulate an application installed within a container (e.g., Mobile Application Management Solution). Simulator A will attempt to enumerate system files outside the container (e.g., password files, network configuration, other application home directories and etc.).

Scenario 3.8—Spear Phishing

Spear phishing is a targeted email scam with the sole purpose of obtaining unauthorized access to sensitive data or resource.

Description: Hacker attempts to social engineer an employee to install a malware Walk-through: Simulator A generates a phishing email with a malicious link. Simulator A sends the email to Simulator B corporate email address. Simulator B receives the email via the corporate email server. Simulator B clicks on the malicious link.

Scenario 3.9—Data Exfiltration (Covert Channels)

In computer security, a covert channel may be defined as a type of computer security attack that creates a capability to transfer information objects between processes that are not supposed to be allowed to communicate by the computer security policy.

Description: Hacker attempts to exfiltrate data using covert channel

Walk-through: Simulator A listens on TCP/IP port '31337'. Simulator B attempts to send a TCP SYN packet with data hidden in the SYN SEQUENCE field Scenario 4—Compliance & Security Policy Security policy is a definition of what it means to be secure for a system, organization or other entity. For systems, the security policy addresses constraints on functions and flow among them, constraints on access by external systems and adversaries including programs and access to data by people.

Scenario 4.1—PCI/Strong Cryptography

According to section 4.1 of the Payment Card Industry Data Security Standard (PCI-DSS) v1.2, merchants handling credit card data are required to "use strong cryptography and security protocols such as SSL/TLS or IPSEC to safeguard sensitive cardholder data during transmission over open, public networks."

Environment: Network

Description: Customer tries to connect to eCommerce store via weak cryptography

Walk-through: Simulator A will simulate a HTTPS server that supports SSLv2 (a weak version of SSL that includes weak ciphers). Simulator B will try to connect to Simulator A via SSLv2 protocol and negotiate a weak cipher.

Scenario 4.2—Health Insurance Portability and Accountability Act (HIPAA)/Protected Health Information (PHI) Encryption The security rule does not expressly prohibit the use of email for sending electronic PHI. However, the standards for access control (45 CFR § 164.312(a)), integrity (45 CFR § 164.312(c)(1)), and transmission security (45 CFR § 164.312(e)(1)) require covered entities to implement policies and procedures to restrict access to, protect the integrity of, and guard against the unauthorized access to electronic PHI sent and received over email communications. The standard for transmission security (§ 164.312

(e)) has been updated to enforce the use of encryption. This means that each covered entity must assess its use of open networks, identify the available and appropriate means to protect electronic PHI as it is transmitted, select a solution, and document the decision. The security rule allows for electronic PHI to be sent over an electronic open network as long as it is adequately protected.

Environment: Network

Description: Employee tries to send PHI (unencrypted) via email.

Walk-through: Simulator A will simulate an SMTP (mail server) server. Simulator B will try to connect to Simulator A via SMTP protocol and use it to send an email with an attachment that contains PHI.

[or]

Simulator A will open an email account (e.g., Google Mail, Yahoo!, Hotmail and etc.) and periodically check it for new mails. Simulator B will connect to an email server (can be the company's email server, or any other email server) and send an email to Simulator A email's address with an attachment that contains PHI.

Scenario 4.3—Password Policy/Internal Security Policy

A password policy can be a set of rules designed to enhance computer security by encouraging users to employ strong passwords and use them properly. A password policy is often part of an organization's official regulations and may be taught as part of security awareness training.

Environment: Local

Description: User attempts to change password to one that violates the company's password policy (e.g., the password does not meet or exceed the length and formation required)

Walk-through: Simulator A will try to change password to a weak one (one that does not meet or exceed the password complexity).

Many of the examples provided in this document are "atomic" steps. In real life, an hacker can use one or more "atomic" steps in order to achieve his or her goal. The following are a few examples that combine one or more "atomic" steps:

EXAMPLE 1

1. Employee clicks on a malicious link (sent via email).
2. As a result, malware is being installed on the employee computer.
3. Malware activates itself and connects to a command & control server.
4. Hacker gains access to the employee computer.
5. Hacker steals source code files from the employee computer via FTP.

EXAMPLE 2

1. Hacker scans a website for vulnerabilities.
2. Hacker exploits SQL injection in a website to get command execution.
3. Hacker opens reverse connection from the server to his computer.
4. Hacker enumerates the network for remote access services (SSH, Telnet, and etc.).
5. Hacker finds SSH (Secure Shell) service on a server in production.
6. Hacker brute forces the administrator password and logs in.
7. Hacker uses SCP (Secure Copy) to copy data from the brute forced server to the original compromised website server.
8. Hacker puts data in the website directory and downloads it from the Internet.

EXAMPLE 3

1. Employee installs a mobile application that turns out to be a malware.
2. Malware activates itself and connects to a command & control server.
3. Hacker gains access to the employee mobile phone.
4. Hacker sends premium SMS (fraud).

The prepared tasks are sent to the simulator nodes, step 404. Sending a task to a simulator node may include loading data onto a simulator node module, loading the data onto a programmable chip or memory for execution by a processor/processor core, or generating a virtual device configured to perform the task. Each simulator node may represent one or more parties (e.g., client devices and servers), devices, networks, and systems participating in a breach scenario. Tasks on the simulator nodes are executed/simulated, step 406. The tasks executed on the simulator nodes may result in data transfers, file modifications, change in system configuration, and change to access permissions, to name a few.

Each simulator node may report its result of the executed tasks/simulation. The results analyzer may receive the result of simulation from the simulator nodes, step 408. A result may include a hash of transferred and received data or some other result. The transferred data may be any file including text, image, video, etc., to be verified. Results from the simulator nodes are analyzed, step 410. Analyzing the results may include summarizing and comparing results of all parties (associated with the simulator nodes).

A next step 412 comprises determining if all parties report on a same result. According to one embodiment, determining a same result may include performing a hash function on transferred data, and performing a hash function on a copy of the transferred data that was successfully received at a second simulator node (or party) from a first simulator node (or party). The hashes of the transferred data and the copy of the transferred data can be compared. Checking comparing hashes of the two files may help eliminate false-positives. In an exemplary simulation, a malicious attachment may be sent from someone outside of a company to someone within the company. A simulator node may be present in the Internet and another connected to the enterprise or company's intranet network. The enterprise simulator may receive the e-mail but the attachment may be removed by an email gateway product. In this case, it may be desired to verify that indeed what the Internet simulator sent was received by the enterprise simulator. However, in other embodiments, other data checking methods may be used to verify whether breached data and the transmitted copy of the breached data are the same.

If the hashes are not equal (all parties do not report on the same result), then a breach is determined as unsuccessful, step 418. Otherwise, if the two hashes are equal, the method proceeds to determine whether all parties report on a successful result at step 414. For example, the breach simulation task may attempt a connection between the first simulator node and the second simulator node. If the connection is unsuccessful, then the breach is determined to be unsuccessful, step 418. Otherwise, a successful transmission along with all of the parties reporting on the same result leads to a determination that the breach was successful (verification of a breach), step 416.

The following includes additional exemplary breach verification methods that may be used to analyze results from the simulator nodes:

Verifying an exfiltration breach scenario may include determining if a first simulator node generates a credit card (information), leaks the credit card via DNS query response and a second simulator node is able to successfully receive the DNS query result. A second exfiltration breach scenario may be verified by determining if a first simulator node takes a user-defined file, opens a FTP connection to a cloud instance, uploads the file, and a second simulator node is able to successfully receive the upload. A third exfiltration breach scenario may be verified by determining if a first simulator connects to a malware server, sends a malware client message and a second simulator node is able to successfully receive the message.

Verifying an infiltration breach scenario may include determining if a first simulator node sends an email with a link, and a second simulator node receives the email, clicks on the link, and is able to reach an external malicious website. A second infiltration breach scenario may be verified by determining if a first simulator node tries to open TCP port 31337 to a second simulator node, and the second simulator node is able to receives the connection and open a socket (assuming port 31337 is not a standard port and is not allowed by the policy). A third infiltration breach scenario may be verified by determining if a subcontractor mobile app (first simulator node) attempts to connect to a production server (second simulator node), and the production server answers the connection (assuming this particular subcontractor should not have access to production server).

Verifying a policy validation scenario may include determining if a first simulator node tries to open TCP port 80 to a second simulator node, and the second simulator node allows and receives the connection and opens a socket (assuming simulator nodes A and B should be segregated due to PCI Compliance). A second policy validation scenario may be verified by determining if a first simulator node mounts a share folder on a second simulator node, the second simulator node generates a sensitive document on the share folder, the first simulator node copies the sensitive document from the second simulator node, connects to Dropbox (or any other external system) and is able to upload the sensitive document.

Figure 5:
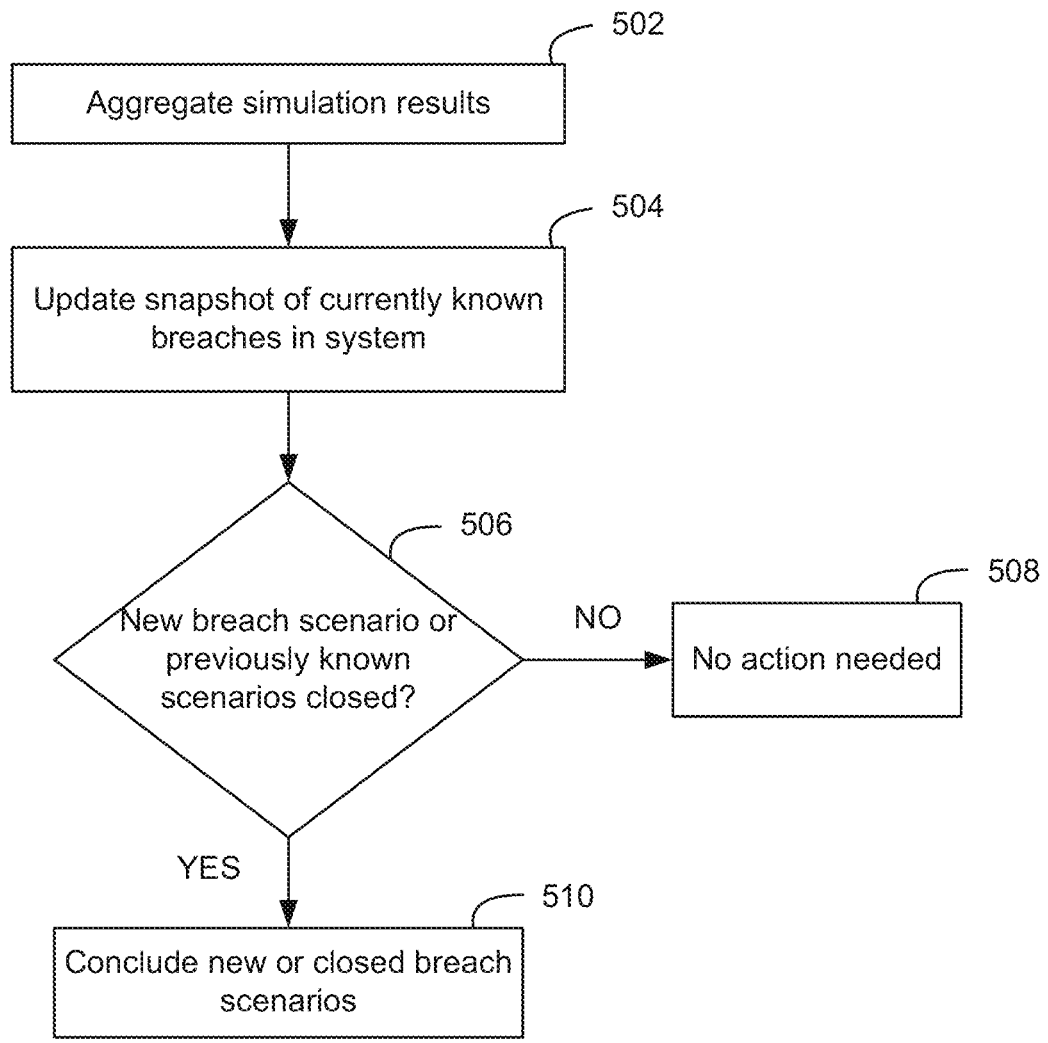
FIG. 5 illustrates a flowchart of a method for managing breach simulation results according to an embodiment of the present invention.

FIG. 5 presents a flowchart of a method for managing breach simulations results according to an embodiment of the present invention.

Simulation results are aggregated, step 502. The results analyzer may read the simulation results from the simulation orchestrator. A snapshot of currently known breaches in system is updated with the simulation results, step 504. The snapshot may be an in-memory graph including simulator nodes as nodes and specific scenarios with their simulation results as edges. In a next step 506, the system determines whether the snapshot has new breach scenarios or previously known scenarios that were closed (fixed). If there are no new or closed breach scenarios, no action is needed or taken, step 508. Otherwise, new or closed breach scenarios are concluded, step 510. New or closed breach scenarios may be concluded by searching the in-memory graph for new breaches and emit breach events for each breach it finds and identifying previously found breaches that have been closed and emits a "breach heal event" for each breach that was closed.

Figure 6:
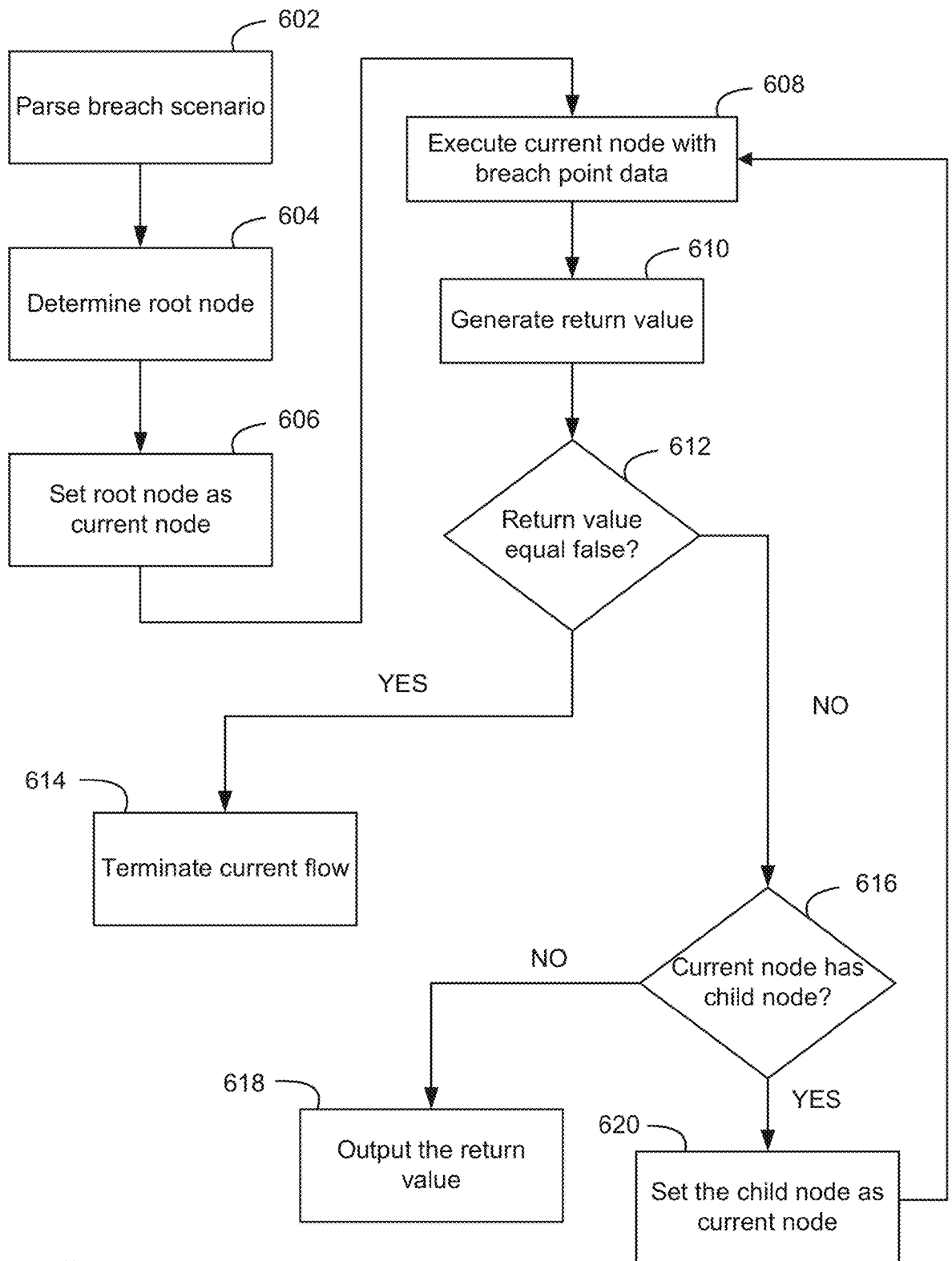
FIG. 6 illustrates a flowchart of a method for executing a breach scenario according to an embodiment of the present invention.

FIG. 6 presents a flowchart of a method for executing a breach scenario according to an embodiment of the present invention. Breach scenarios are able to be executed in the form of executable workflows or graphs including malicious actions as nodes and each step may be connected to one or more further steps. A breach scenario is parsed, step 602. The breach scenario may be parsed from a program file input, file, or data entry that models the flow of the breach scenario. Parsing the breach scenario includes extracting a graph (e.g., textual, numerical, symbolic or graphical) or flow of tasks/operations comprising action components as nodes connected together by edges and in a particular order. An action component may include executable code or instructions that can be written in any programming language for execution of tasks within a breach scenario by a simulation node. For example, a breach scenario for simulating an attacker trying to connect to a given computer, login as an administrator, and afterward execute a FORMAT command on a disk C may include a directed graph with three nodes connected by two edges where the root node of the breach scenario is a "ConnectToComputer" action component node having a "LoginAsAdmin" child node, and the "LoginAsAdmin" action component node further includes a "FormatDiskC" child node.

A root node is determined, step 604. The root node can be used to establish a first step in a series of nodes in a breach scenario execution flow. Determining the root node may include finding a node with no parent node. Referring to the previous example, the "ConnectToComputer" action component node may be determined as the root node. The determined root node is set as a current node, step 606. The current node may be a pointer that identifies a "visit" to a given node during a traversal of a graph of nodes (breach scenario).

The current node is executed with breach point data, Step 608. Code or instructions from the action component corresponding to the current node can be executed with breach point data provided as input. Breach point data may be comprised in a data structure (e.g., dictionary, associative array, serialized data container, hash, etc.) that includes keys and values that each action component can accept. The breach point data may contain values that can be accessed via keys such as IP addresses, ports, data, protocols, filenames (if applicable), and any other information that is related to a breach scenario execution flow. For example, information for running or executing action components are included in the breach point data such as a data key (e.g., breach data—an asset to leak in an exfiltration scenario). Optionally, breach point data may include a debug key to allow for triggering number of prints in the action component for a user (such as a system administrator) to debug the action component logic. Breach point data may be initialized by the simulation orchestrator and provided to the root node of breach scenarios. For example, breach point data may contain empty or initialized values to be received by an action component at a root node of a breach scenario.

A return value is generated, step 610. The return value may be indicative of a result of the execution of the current node. During action component execution, it may change the breach point data (e.g., by adding new keys, deleting keys, changing key values, etc.) and return a modified copy of the breach point data (the return value). The return value comprising the modified breach point data may be used as input for execution of a next action component in the breach scenario. The action component may also generate a false (or null) return value upon an unsuccessful execution (e.g., a "ConnectToComputer" action could not be completed).

A determination is made whether the return value is equal to a false return value, step 612. If the return value is false, current flow of the breach scenario is terminated, step 614. The unsuccessful execution of an action component can indicate that a breach attempt has failed, and that further traversal of the nodes (and execution of their action components) for the breach scenario is unnecessary. Otherwise, if the return value is not equal to a false return value (e.g., modified breach point data), it is determined whether the current node has a child node, step 616. The child node may be a node connected to the root node that does not have a parent node. Alternatively, the child node may be a node that is connected to the root node and depends on the execution of the action component of the root node (e.g., uses the return value as input).

Absence of a child node may indicate that there are no further action components remaining in the execution flow of the breach scenario for simulation. If the current node does not have a child node, the return value is generated as an output result, step 618. A presence of a child node will set the current node to the child node, step 620 and the method may proceed to execute the new current node with the return value (modified breach point data) as the breach point data at step 608. In certain instances, a plurality of children nodes may be connected to a current node such as when execution of a current node is followed by a condition statement or branching, that of which, a given one of the children node will be selected and set as the new current node based on a satisfied condition.

Figure 7:
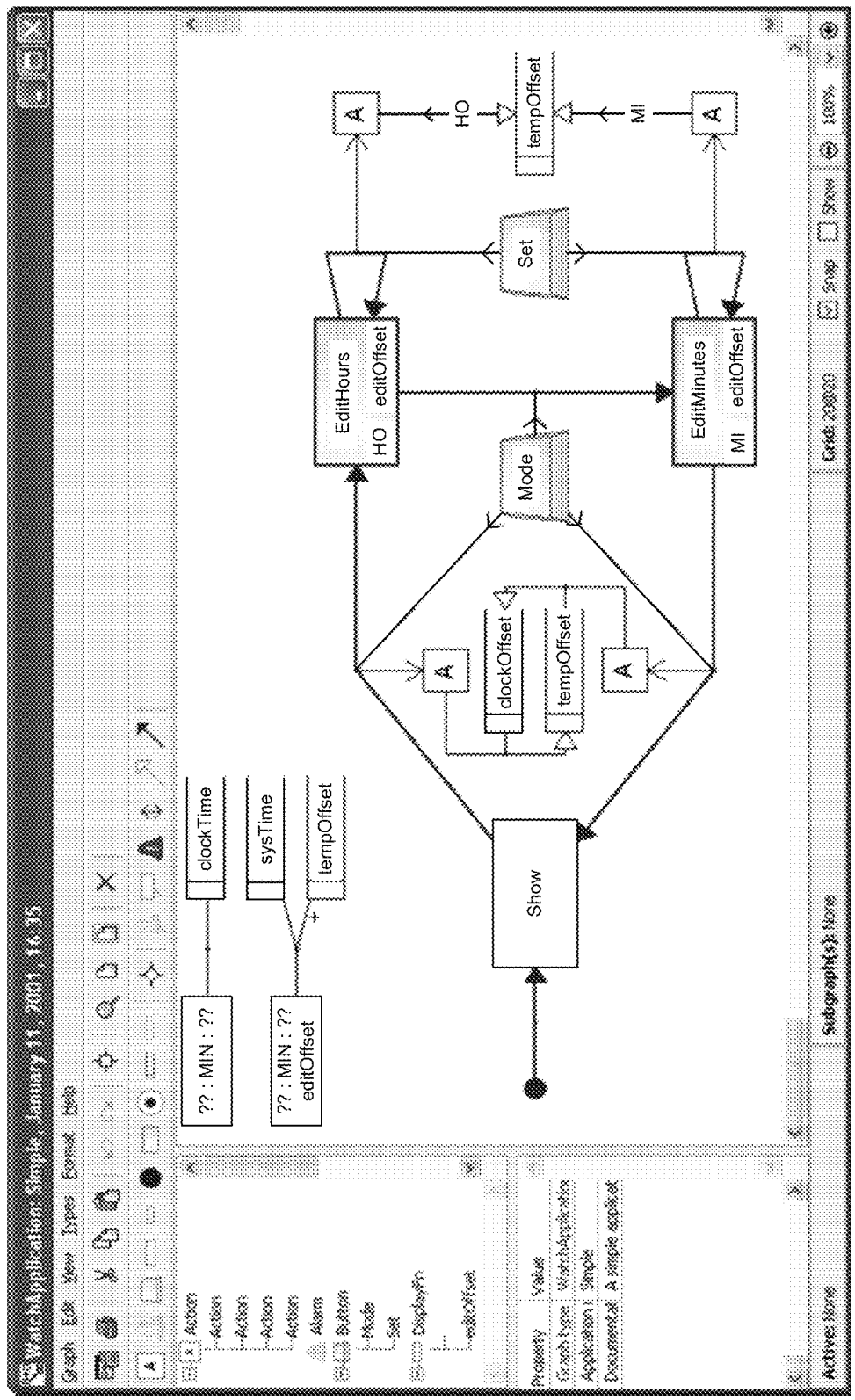
FIG. 7 illustrates an interface tool for editing breach scenarios according to an embodiment of the present invention.

FIG. 7 presents an interface tool for editing breach scenarios according to an embodiment of the present invention. The exemplary editing tool allow for users to create executable workflows/graphs for breach scenarios or modifying existing ones by changing the order of steps (nodes and edges), and/or adding new steps, and/or changing steps parameters, and/or removing already-existing steps. The editing tool may providing tools for adding steps, devices and other elements in a breach scenario workflow (similar to ones that may be found in engineering modeling and simulation tools). Breach scenarios may also be created or modified using domain specific language to describe the breach scenarios. Domain-specific languages may be able to capture both offensive and defensive security components into a workflow.

FIGS. 1 through 8 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A system for identifying breach vulnerabilities in a networked production environment including hardware components configured according to a security policy in a network, the system comprising:
an execution manager subsystem configured to:
deploy simulator nodes to the networked production environment, the simulator nodes representing one or more users, program code, or devices;
transmit to the deployed simulator nodes electronic task data comprising computer instructions which, when executed by each of the simulator nodes, causes it to simulate one or more operations of a user, program code or device involved in breach scenarios;
execute a breach scenario to validate the security policy by transmitting the electronic task data representing such breach scenario to the simulator nodes involved in the breach scenario;
a results analyzer subsystem configured to:
receive results of the executed electronic task data from the simulator nodes involved in the breach scenario;
validate success of the breach scenario based on the received results from the simulator nodes, wherein the received results include a communication connection established, success of the simulator nodes sending and receiving data, and the simulator nodes utilizing metadata facts, and wherein the metadata facts include at least one of check-sum, file size, and regular expression;
identify a successful breach based on the validation of success; and
a fix orchestrator subsystem configured to resolve the successful breach by generating a security configuration and transmitting the security configuration to the execution manager subsystem to protect against the successful breach in accordance with the security policy.

2. The system of claim 1 comprising the results analyzer subsystem configured to identify the successful breach is further configured to:
determine a first one of the simulator nodes generates financial information;
determine the first one of the simulator nodes responds to a domain name system ("DNS") query with the financial information; and
determine a second one of the simulator nodes successfully receives the financial information from the DNS query.

3. The system of claim 1 comprising the results analyzer subsystem configured to identify the successful breach is further configured to:
determine a first one of the simulator nodes uploads a user-defined file via a file transfer protocol ("FTP") connection; and
determine a second one of the simulator nodes successfully receives the uploaded user-defined file.

4. The system of claim 1 comprising the results analyzer subsystem configured to identify the successful breach is further configured to:
determine a first one of the simulator nodes connects to a malware server;
determine the first one of the simulator nodes sends a malware client message to the malware server; and
determine a second one of the simulator nodes successfully receives the malware client message.

5. The system of claim 1 comprising the results analyzer subsystem configured to identify the successful breach is further configured to:
determine a first one of the simulator nodes representative of a subcontractor mobile client application attempts to connect to a second one of the simulator nodes representative of a production server; and
determine the second one of the simulator nodes answers the connection attempt.

6. The system of claim 1 comprising the results analyzer subsystem configured to identify the successful breach is further configured to:

determine a first one of the simulator nodes attempts to open a transmission control protocol ("TCP") port to a second one of the simulator nodes; and
determine the second one of the simulator nodes allows the attempt and opens a socket.

7. The system of claim 1 comprising the results analyzer subsystem configured to identify the successful breach is further configured to:
determine a first one of the simulator nodes mounts a share folder on a second one of the simulator nodes;
determine the second one of the simulator nodes generates a document on the share folder;
determine the first one of the simulator nodes accesses the document from the share folder; and
determine the first one of the simulator nodes uploads the document to an external system.

8. The system of claim 1 comprising the execution manager subsystem further configured to parse a breach scenario file, the breach scenario file comprising a workflow including action component nodes each connected to one or more other action component nodes by one or more edges, each action component node comprising executable electronic task code representing one or more tasks for execution by the simulator nodes to simulate the one or more operations of the user, program code or device involved in the breach scenarios.

9. The system of claim 8 comprising the execution manager subsystem further configured to:
determine a root node from the action component nodes, wherein determining the root node includes finding a node with no parent node and wherein the root node is used to establish a first step in a series of nodes in a breach scenario execution flow;
execute the root node with at least part of the stored breach point data, wherein the breach point data comprises data values accessible by keys, the data values containing Internet protocol (IP) addresses, ports, protocols, filenames or information related to the breach scenario execution flow; and
generate a root node return value based on the execution of the root node, the root node return value including a modified copy of the breach point data.

10. The computing system of claim 9 wherein the root node return value is representative of a result from the execution of the root node.

11. A method for identifying breach vulnerabilities in a networked production environment including hardware components configured according to a security policy, the method comprising:
deploying, by a processing device, simulator nodes to the networked production environment, the simulator nodes representing one or more users, program code, or devices;
transmitting, by the processing device, to the deployed simulator nodes electronic task data comprising computer instructions which, when executed by each of the simulator nodes, causes it to simulate one or more operations of a user, program code or device involved in breach scenarios;
executing, by the processing device, a breach scenario to validate the security policy by transmitting the electronic task data representing such breach scenario to the simulator nodes involved in the breach scenario;
receiving, by the processing device, results of the executed electronic task data from the simulator nodes involved in the breach scenario;

validating, by the processing device, success of the breach scenario based on the received results from the simulator nodes, wherein the received results include a communication connection established, success of the simulator nodes sending and receiving data, and the simulator nodes utilizing metadata facts, and wherein the metadata facts include at least one of check-sum, file size, and regular expression;

identifying, by the processing device, a successful breach based on the validation of success; and resolving, by the processing device, the successful breach by generating a security configuration and transmitting the security configuration to a security controller to protect against the successful breach in accordance with the security policy.

12. The method of claim 11 wherein identifying the successful breach further comprises:

determining a first one of the simulator nodes generates financial information;

determining the first one of the simulator nodes responds to a domain name system ("DNS") query with the financial information; and determining a second one of the simulator nodes successfully receives the financial information from the DNS query.

13. The method of claim 11 wherein identifying the successful breach further comprises:

determining a first one of the simulator nodes uploads a user-defined file via a file transfer protocol ("FTP") connection; and determining a second one of the simulator nodes successfully receives the uploaded user-defined file.

14. The method of claim 11 wherein identifying the successful breach further comprises:

determining a first one of the simulator nodes connects to a malware server;

determining the first one of the simulator nodes sends a malware client message to the malware server; and determining a second one of the simulator nodes successfully receives the malware client message.

15. The method of claim 11 wherein identifying the successful breach further comprises:

determining a first one of the simulator nodes representative of a subcontractor mobile client application attempts to connect to a second one of the simulator nodes representative of a production server; and determining the second one of the simulator nodes answers the connection attempt.

16. The method of claim 11 wherein identifying the successful breach further comprises:

determining a first one of the simulator nodes attempts to open a transmission control protocol ("TCP") port to a second one of the simulator nodes; and determining the second one of the simulator nodes allows the attempt and opens a socket.

17. The method of claim 11 wherein identifying the successful breach further comprises:

determining a first one of the simulator nodes mounts a share folder on a second one of the simulator nodes;

determining the second one of the simulator nodes generates a document on the share folder;

determining the first one of the simulator nodes accesses the document from the share folder; and determining the first one of the simulator nodes uploads the document to an external system.

18. The method of claim 11 further comprising parsing a breach scenario file, the breach scenario file comprising a workflow including action component nodes each connected to one or more other action component nodes by one or more edges, each action component node comprising executable electronic task code representing one or more tasks for execution by the simulator nodes to simulate the one or more operations of the user, program code or device involved in the breach scenarios.

19. The method of claim 18 further comprising:

determining a root node from the action component nodes, wherein determining the root node includes finding a node with no parent node and wherein the root node is used to establish a first step in a series of nodes in a breach scenario execution flow;

executing the root node with at least part of the stored breach point data, wherein the breach point data comprises data values accessible by keys, the data values containing Internet protocol (IP) addresses, ports, protocols, filenames or information related to the breach scenario execution flow; and generating a root node return value based on the execution of the root node, the root node return value including a modified copy of the breach point data.

20. The method of claim 19 wherein the root node return value is representative of a result from the execution of the root node.

21. A non-transitory computer-readable media comprising program code that when executed by a programmable processor causes execution of a n operation for identifying breach vulnerabilities in a networked production environment including hardware components configured according to a security policy, the non-transitory computer-readable media comprising:

computer program code for deploying simulator nodes to the networked production environment, the simulator nodes representing one or more users, program code, or devices;

computer program code for transmitting to the deployed simulator nodes electronic task data comprising computer instructions which, when executed by each of the simulator nodes, causes it to simulate one or more operations of a user, program code or device involved in breach scenarios;

computer program code for executing a breach scenario to validate the security policy by transmitting the electronic task data representing such breach scenario to the simulator nodes involved in the breach scenario;

computer program code for receiving results of the executed electronic task data from the simulator nodes involved in the breach scenario;

computer program code for validating success of the breach scenario based on the received results from the simulator nodes, wherein the received results include a communication connection established, success of the simulator nodes sending and receiving data, and the simulator nodes utilizing metadata facts, and wherein the metadata facts include at least one of check-sum, file size, and regular expression;

computer program code for identifying a successful breach based on the validation of success; and computer program code for resolving the successful breach by generating a security configuration and transmitting the security configuration to a security controller to protect against the successful breach in accordance with the security policy.

22. The non-transitory computer-readable media of claim 21 wherein the computer program code for identifying the successful breach further comprises:

computer program code for determining a first one of the simulator nodes generates financial information;

computer program code for determining the first one of the simulator nodes responds to a domain name system ("DNS") query with the financial information; and computer program code for determining a second one of the simulator nodes successfully receives the financial information from the DNS query.

23. The non-transitory computer-readable media of claim 21 wherein the computer program code for identifying the successful breach further comprises:

computer program code for determining a first one of the simulator nodes connects to a malware server;

computer program code for determining the first one of the simulator nodes sends a malware client message to the malware server; and computer program code for determining a second one of the simulator nodes successfully receives the malware client message.

24. The non-transitory computer-readable media of claim 21 wherein the computer program code for identifying the successful breach further comprises:

computer program code for determining a first one of the simulator nodes mounts a share folder on a second one of the simulator nodes;

computer program code for determining the second one of the simulator nodes generates a document on the share folder;

computer program code for determining the first one of the simulator nodes accesses the document from the share folder; and computer program code for determining the first one of the simulator nodes uploads the document to an external system.

25. The non-transitory computer-readable media of claim 21 further comprising computer program code for parsing a breach scenario file, the breach scenario file comprising a workflow including action component nodes each connected to one or more other action component nodes by one or more edges, each action component node comprising executable electronic task code representing one or more tasks for execution by the simulator nodes to simulate the one or more operations of the user, program code or device involved in the breach scenarios.

26. The non-transitory computer-readable media of claim 25 further comprising:

computer program code for determining a root node from the action component nodes, wherein determining the root node includes finding a node with no parent node and wherein the root node is used to establish a first step in a series of nodes in a breach scenario execution flow;

computer program code for executing the root node with at least part of the stored breach point data, wherein the breach point data comprises data values accessible by keys, the data values containing Internet protocol (IP) addresses, ports, protocols, filenames or information related to the breach scenario execution flow; and computer program code for generating a root node return value based on the execution of the root node, the root node return value including a modified copy of the breach point data.

27. The non-transitory computer-readable media of claim 26 wherein the root node return value is representative of a result from the execution of the root node.

* * * * *